(12) United States Patent
Sachs et al.

(10) Patent No.: US 11,931,767 B2
(45) Date of Patent: Mar. 19, 2024

(54) METERING BUILD MATERIAL IN THREE-DIMENSIONAL (3D) PRINTING USING A TOOL

(71) Applicant: Desktop Metal, Inc., Burlington, MA (US)

(72) Inventors: Emanuel M. Sachs, Newton, MA (US); Midnight Zero, Wilmington, MA (US)

(73) Assignee: Desktop Metal, Inc., Burlington, MA (US)

( * ) Notice: Subject to any disclaimer, the term of this patent is extended or adjusted under 35 U.S.C. 154(b) by 0 days.

(21) Appl. No.: 15/956,467

(22) Filed: Apr. 18, 2018

(65) Prior Publication Data

US 2018/0304302 A1    Oct. 25, 2018

Related U.S. Application Data

(60) Provisional application No. 62/488,414, filed on Apr. 21, 2017.

(51) Int. Cl.
*B22F 12/52*    (2021.01)
*B05C 19/04*    (2006.01)
(Continued)

(52) U.S. Cl.
CPC .............. *B05C 19/04* (2013.01); *B22F 3/004* (2013.01); *B22F 10/14* (2021.01); *B22F 12/17* (2021.01);
(Continued)

(58) Field of Classification Search
CPC ......... B22F 3/1055; B22F 12/00; B22F 12/52
See application file for complete search history.

(56) References Cited

U.S. PATENT DOCUMENTS 3,900,602 A * 8/1975 Rummel ............... H01M 4/886
  427/115
4,811,864 A * 3/1989 Balmer .................. B65G 45/14
  222/148

(Continued)

FOREIGN PATENT DOCUMENTS

DE   102013007482 A1   10/2014
EP       1700686 A2    9/2006
(Continued)

OTHER PUBLICATIONS

Gibson, et al., Additive Manufacturing Technologies, Springer, 2010.*

(Continued)

*Primary Examiner* — Christopher S Kessler
(74) *Attorney, Agent, or Firm* — Oak Law, PLLC; Jonathan D. Hall

(57) ABSTRACT

A metering apparatus and corresponding method meter a powder material in a three-dimensional (3D) printing system. The metering apparatus comprises a hopper with walls configured to contain a powder material, a metering roller, and a tool. The metering roller is located beneath an opening of the hopper. The metering roller and a given wall of the walls of the hopper are spaced apart by a gap therebetween at the opening; the gap in combination with rotation of the metering roller causes the powder material to flow from under the given wall of the hopper at a substantially predictable rate. The tool is positioned at the given wall where the flow emerges and is configured to force the powder material off of the metering roller to supply the 3D printing system with the powder material for printing a 3D object.

28 Claims, 33 Drawing Sheets
(12 of 33 Drawing Sheet(s) Filed in Color)

(51) Int. Cl.

| | |
|---|---|
| *B22F 3/00* | (2021.01) |
| *B22F 10/14* | (2021.01) |
| *B22F 12/00* | (2021.01) |
| *B22F 12/17* | (2021.01) |
| *B22F 12/57* | (2021.01) |
| *B22F 12/63* | (2021.01) |
| *B28B 1/00* | (2006.01) |
| *B29C 41/00* | (2006.01) |
| *B29C 41/12* | (2006.01) |
| *B29C 41/36* | (2006.01) |
| *B29C 64/165* | (2017.01) |
| *B29C 64/343* | (2017.01) |
| *B33Y 30/00* | (2015.01) |
| *B33Y 40/00* | (2020.01) |
| *B33Y 50/02* | (2015.01) |
| *B33Y 70/00* | (2020.01) |
| *B29C 64/205* | (2017.01) |
| *B33Y 10/00* | (2015.01) |

(52) U.S. Cl.
CPC ............ *B22F 12/222* (2021.01); *B22F 12/52* (2021.01); *B22F 12/57* (2021.01); *B22F 12/63* (2021.01); *B28B 1/001* (2013.01); *B29C 41/006* (2013.01); *B29C 41/12* (2013.01); *B29C 41/36* (2013.01); *B29C 64/165* (2017.08); *B29C 64/343* (2017.08); *B33Y 30/00* (2014.12); *B33Y 40/00* (2014.12); *B33Y 50/02* (2014.12); *B33Y 70/00* (2014.12); *B22F 2998/10* (2013.01); *B29C 64/205* (2017.08); *B33Y 10/00* (2014.12)

(56) References Cited

U.S. PATENT DOCUMENTS

| | | | |
|---|---|---|---|
| 5,204,055 | A | 4/1993 | Sachs et al. |
| 6,217,649 | B1 | 4/2001 | Wallace, Jr. et al. |
| 6,238,614 | B1 | 5/2001 | Yang et al. |
| 7,241,415 | B2 | 7/2007 | Khoshnevis |
| 7,917,243 | B2 | 3/2011 | Kozlak et al. |
| 2004/0239009 | A1 | 12/2004 | Collins et al. |
| 2005/0074550 | A1 | 4/2005 | Leuterer et al. |
| 2006/0141145 | A1* | 6/2006 | Davidson ................ B29C 41/12 427/203 |
| 2009/0004380 | A1* | 1/2009 | Hochsmann .......... B29C 64/153 427/203 |
| 2010/0034570 | A1* | 2/2010 | Hatakeyama .......... G03G 21/00 399/346 |
| 2011/0293823 | A1 | 12/2011 | Bruderer et al. |
| 2015/0352639 | A1 | 12/2015 | Toyserkani et al. |
| 2015/0360421 | A1 | 12/2015 | Burhop et al. |
| 2015/0367415 | A1 | 12/2015 | Buller et al. |
| 2016/0075084 | A1 | 3/2016 | Sakura |
| 2017/0326789 | A1 | 11/2017 | Kimblad et al. |
| 2018/0056595 | A1 | 3/2018 | Sterenthal et al. |
| 2018/0154580 | A1 | 6/2018 | Mark |
| 2018/0304301 | A1 | 10/2018 | Sachs et al. |
| 2019/0091921 | A1* | 3/2019 | Paternoster ............. B29C 64/20 |

FOREIGN PATENT DOCUMENTS

| | | |
|---|---|---|
| WO | 03026876 A2 | 4/2003 |
| WO | 2016176432 A1 | 11/2016 |

OTHER PUBLICATIONS

Alec, "Metal 3d printing soon 'affordable' thanks to new Selective Inhibition Sintering (SIS) process," 5 pages, retrieved from https://www.3ders.org/articles/20141111-metal-3d-printing-soon-affordable-new-selective-inhibition-sintering-process.html, Nov. 11, 2014.

Star Rapid, "New Process to 3D Printed Metal for Mass Production," Additive Manufacturing, 7 pages, retrieved from https:///www.starrapid.com/blog/new-process-to-3d-print-metal-for-mass-production/, retrieved on Oct. 1, 2018.

International Search Report and Written Opinion re International Application No. PCT/US2018/028152 entitled "Metering Build Material In Three-Dimensional (3D) Printing" dated Jul. 4, 2018.

International Search Report and Written Opinion re International Application No. PCT/US2018/028156 entitled "Metering Build Material in Three-Dimensional (3D) Printing Using a Tool" dated Jul. 6, 2018.

\* cited by examiner

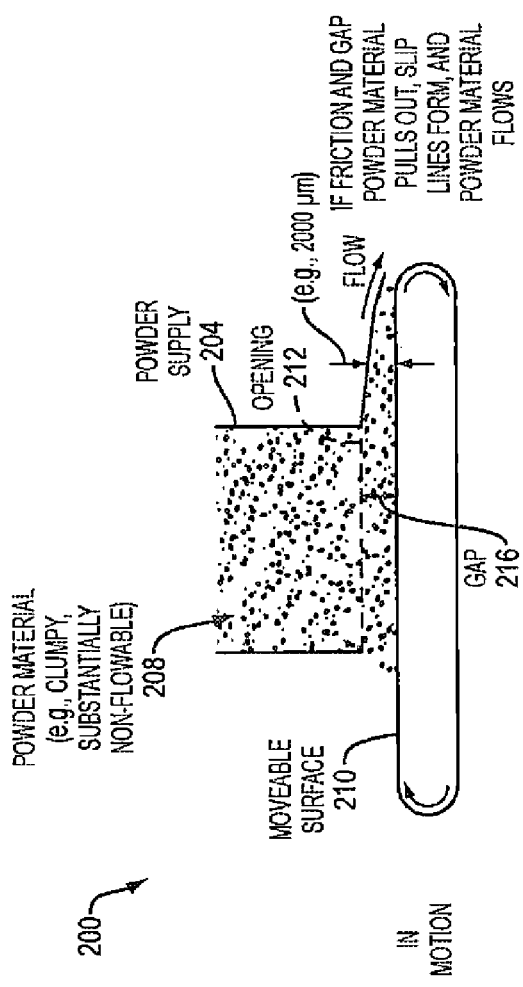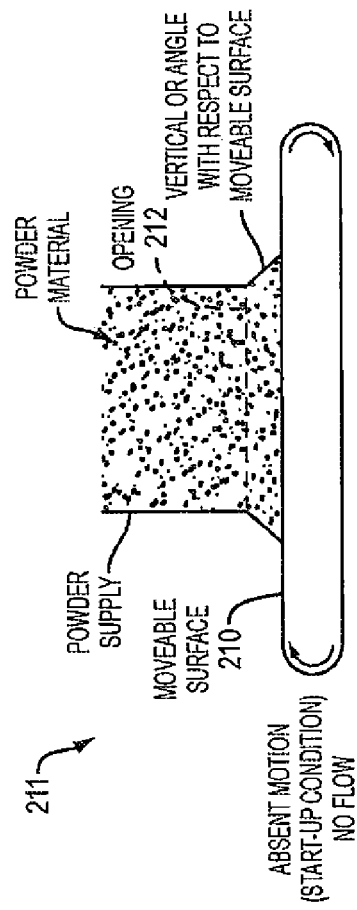
FIG. 2A
FIG. 2B

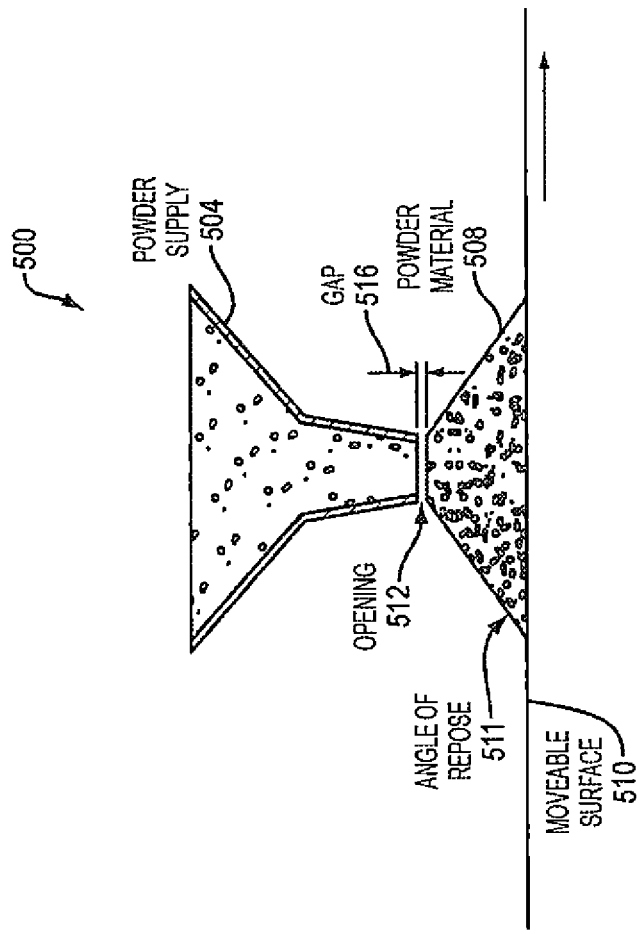

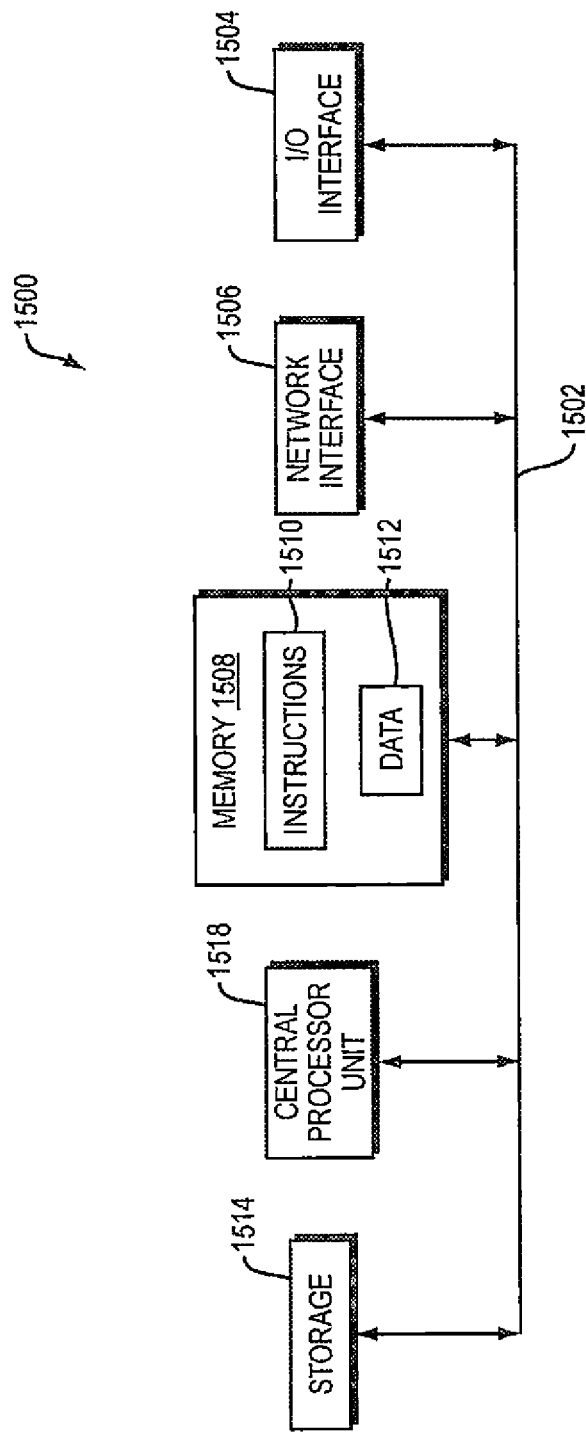

METERING BUILD MATERIAL IN THREE-DIMENSIONAL (3D) PRINTING USING A TOOL

RELATED APPLICATION

This application claims the benefit of U.S. Provisional Application No. 62/488,414, filed on Apr. 21, 2017. The entire teachings of the above application are incorporated herein by reference.

BACKGROUND

Binder jetting is an additive manufacturing technique based on the use of a liquid binder to join particles of a powder material to form a three-dimensional (3D) object. In particular, a controlled pattern of the liquid binder may be applied to successive layers of the powder material in a powder bed such that the layers of the powder material adhere to one another to form the 3D object. Through subsequent processing, such as sintering, the 3D object may be formed into a finished object that may be referred to as a finished 3D part.

SUMMARY

According to an example embodiment, a method for additive manufacturing of a three-dimensional (3D) object may comprise metering a powder material at an opening of a powder supply storing the powder material to produce a flow of the powder material away from the powder supply and onto a moveable surface located beneath the opening. The opening and the moveable surface may be spaced apart by a gap therebetween. The metering may be based on the gap and a motion of the moveable surface relative to the powder supply. The motion may enable the powder material to flow from the powder supply. The method may comprise depositing the flow from the moveable surface onto a top surface of a powder bed to produce a metered amount of the powder material on the top surface of the powder bed, leveling the metered amount across the top surface of the powder bed to form a layer of the powder material, and applying a binder fluid to at least one region of the layer, the binder fluid causing powder material of the layer to become bonded at the at least one region to form a bonded layer of the 3D object.

Absent the motion, the powder material may not flow from the powder supply.

The depositing may include depositing the flow uniformly on the top surface of the powder bed.

The depositing, leveling, and applying may be performed sequentially for a given layer.

At least two of the depositing, leveling, and applying may be activated concurrently for a given layer.

The depositing, leveling, and applying may be operations that are activated concurrently for a given layer.

The method may further comprise moving the powder supply and the moveable surface across the top surface of the powder bed as a unit.

The leveling may include traversing the top surface of the powder bed in a traversal direction by a leveler. The method may further comprise traversing the top surface of the powder bed by the unit in the traversal direction and the depositing may include depositing the flow onto the top surface of the powder bed ahead of the traversing by the leveler.

The method may further comprise moving a printhead together with the unit and the applying may include applying the binder fluid by the printhead following the traversal by the leveler.

The leveling may be performed by a leveler, and the applying may be performed by a printhead. The method may further comprise configuring the leveler and the printhead to traverse the top surface of the powder bed as a unit.

The moveable surface may be a roller and the method may further comprise forcing the flow of the powder material off the moveable surface and onto the top surface of the powder bed via a tool.

The tool may be at least one of an air knife, razor, wire, or rotatable surface with brushes.

The moveable surface may be a belt.

The belt may be included in a conveyor belt assembly including pulleys, and the method may further comprise moving the belt via the pulleys.

The moveable surface may be a roller with a roughened surface.

The powder material may be a substantially flowable powder material, the gap may be configured to cause the substantially flowable powder material to stop flowing absent the motion, and the powder material may form an angle of repose with the belt.

The moveable surface may be at least one roller.

The at least one roller may be a pair of rollers, and the method may further comprise configuring the pair of rollers to rotate in opposite directions to enable the powder material to flow between the pair of rollers and configuring the pair of rollers to be stationary to stop the flow.

The at least one roller may include at least one notch, and the method may further comprise catching and releasing the powder material via the at least one notch.

The leveling may include traversing the top surface of the powder bed by a roller, and the method may further comprise configuring the roller to rotate such that, at a contact point between the roller and the top surface of the powder bed, a tangential direction of travel of the contact point with the top surface of the powder bed is in a same direction as traversal of the roller.

The powder supply may be a hopper.

The method may further comprise supporting the powder bed by a piston, surrounding the powder bed by walls, and moving the piston downward following application of the binder fluid.

The method may further comprise heating the powder bed to dry the binder and to maintain flowability of the powder material.

The method may further comprise controlling motion of a leveler to perform the leveling, controlling release of the binder fluid from a printhead to perform the applying, and controlling a vertical movement of the top surface of the powder bed following the applying.

The powder material may be a metallic powder.

The method may further comprise (i) moving the powder bed downward in a vertical direction to enable formation of a successive layer of the powder material, the bonded layer becoming the top surface of the powder bed, (ii) depositing the flow from the moveable surface onto the bonded layer to produce a metered amount of the powder material on the bonded layer, (iii) leveling the metered amount across the bonded layer to form a successive layer of the powder material, (iv) applying the binder fluid to at least one respective region of the successive layer to cause the successive layer to become bonded at the least one respective region and to each layer adjacent thereto, and repeating (i) through (iv) in accordance with a definition for the 3D object.

According to another example embodiment, a system for additive manufacturing of a three-dimensional (3D) object may comprise a powder supply configured to store a powder material, a moveable surface located beneath an opening of the powder supply, a controller configured to control a motion of the moveable surface relative to the powder supply to meter the powder material at the opening to produce a flow of the powder material away from the powder supply and onto the moveable surface. The opening and the moveable surface may be spaced apart by a gap therebetween. The meter operation may be based on the gap and the motion of the moveable surface, the motion enabling the powder material to flow from the powder supply. The moveable surface may be configured to deposit the flow onto a top surface of a powder bed to produce a metered amount of the powder material on the top surface of the powder bed. The system may comprise a leveler, configured to level the metered amount across the top surface of the powder bed to form a layer of the powder material, and a printhead. The printhead may be configured to apply a binder fluid to at least one region of the layer. The binder fluid may be configured to cause the layer to become bonded at the at least one region to form a bonded layer of the 3D object.

Absent the motion, the powder material may not flow from the powder supply.

The flow may be deposited uniformly on the top surface of the powder bed.

The deposit, level, and apply operations may be sequential operations.

At least two of the deposit, level, and apply operations may be concurrent operations.

The deposit, level, and apply operations may be concurrent operations.

The powder supply and the moveable surface may be configured to move across the top surface of the powder bed as a unit.

The leveler may be configured to traverse the top surface of the powder bed in a traversal direction and the unit may be configured to traverse the top surface of the powder bed in the traversal direction and deposit the flow onto the top surface of the powder bed ahead of a traversal by the leveler.

The unit may include the printhead and the printhead may be configured to apply the binder fluid following the traversal by the leveler.

The leveler and the printhead may be configured to traverse the top surface of the powder bed as a unit.

The printhead may be configured to apply the binder fluid following the traversal by the leveler.

The moveable surface may be a roller and the system may further comprise a tool configured to force the flow of the powder material off the moveable surface and onto the top surface of the powder bed.

The tool may be at least one of an air knife, a razor, a wire, or a rotatable surface with brushes.

The moveable surface may be a belt.

The system may further comprise a conveyor belt assembly. The conveyor belt assembly may include the belt.

The conveyor belt assembly may further include pulleys for moving the belt.

The moveable surface may be a roller with a roughened surface.

The powder material may be a substantially flowable powder material, the gap may be configured to cause the substantially flowable powder material to stop flowing absent the motion, and the powder material may form an angle of repose with the belt.

The moveable surface may be at least one roller.

The at least one roller may be a pair of rollers configured to rotate in opposite directions. The motion may enable the powder material to flow between the pair of rollers. Absent the motion, the powder material may not flow between the pair of rollers.

The pair of rollers may be configured to rotate in opposite directions.

The at least one roller may include at least one notch for catching and releasing the powder material.

The leveler may be a roller configured to traverse the top surface of the powder bed and rotate such that, at a contact point between the roller and the top surface of the powder bed, a tangential direction of travel of the contact point with the top surface of the powder bed is in a same direction as traversal of the roller.

The powder supply may be a hopper.

The powder bed may be supported by a piston and surrounded by walls and the piston may be configured to move downward following application of the binder fluid.

The system may further comprise a heater. The heater may be configured to heat the powder bed to dry the binder and to maintain flowability of the powder material.

The controller may be further configured to control motion of the leveler, release of the binder fluid from the printhead, and a vertical movement of the top surface of the powder bed.

The powder material may be a metallic powder.

According to the example embodiment of the system, (i) the bonded layer may become the top surface of the powder bed and the powder bed may be configured to move downward in a vertical direction to enable formation of a successive layer of the powder material, (ii) the moveable surface may be further configured to deposit the flow onto the bonded layer to produce a metered amount of the powder material on the bonded layer, (iii) the leveler may be further configured to level the metered amount across the bonded layer to form a successive layer of the powder material, (iv) the printhead may be further configured to apply the binder fluid to at least one respective region of the successive layer to cause the successive layer to become bonded at the least one respective region and to each layer adjacent thereto, and the system may be configured to repeat (i) through (iv) in accordance with a definition for the 3D object.

According to another example embodiment, a method for additive manufacturing of a three-dimensional (3D) object may comprise means for metering a powder material at an opening of a powder supply storing the powder material to produce a flow of the powder material away from the powder supply and onto a moveable surface located beneath the opening. The opening and the moveable surface may be spaced apart by a gap therebetween, the metering being based on the gap and a motion of the moveable surface relative to the powder supply, the motion enabling the powder material to flow from the powder supply. The method may comprise means for depositing the flow from the moveable surface onto a top surface of a powder bed to produce a metered amount of the powder material on the top surface of the powder bed, means for leveling the metered amount across the top surface of the powder bed to form a layer of the powder material, and means for applying a binder fluid to at least one region of the layer, the binder fluid causing the layer to become bonded at the at least one region to form a bonded layer of the 3D object.

According to another example embodiment, a metering apparatus for metering a powder material in a three-dimensional (3D) printing system may comprise a hopper, a metering roller, and a tool. The hopper has walls configured to contain a powder material and defining an opening sized and positioned to enable the powder material to flow therethrough. The metering roller is located beneath the opening of the hopper. The metering roller and a given wall of the walls of the hopper may be spaced apart by a gap therebetween at the opening, the gap in combination with rotation of the metering roller causing a flow of the powder material to flow from under the given wall of the hopper at a substantially predictable rate. The tool may be configured to force flow of the powder material off of the metering roller at the substantially predictable rate to supply the 3D printing system with the powder material for printing a 3D object. The tool may be positioned at the given wall where the flow emerges due to the rotation.

A surface of the metering roller may be a roughened surface.

The tool may be arranged in contact with the metering roller, a side of the given wall, or a combination thereof.

The tool may be configured to span at least a portion of a length of the metering roller and may be arranged in contact with the metering roller. The tool may be configured to move in a manner that forces flow of the powder material off the metering roller. The motion may be rotation.

The tool may be a brush and the brush may be a flexible, spiral, nylon brush.

The tool may be a sheet of metal or plastic configured to act as a knife to skive the powder material off of the metering roller.

The metering apparatus may further comprise a support rail, spanning at least a portion of a length of the tool, configured to support the tool in the arrangement with the metering roller.

The metering apparatus may further comprise a motor configured to cause motion of the tool. The motion may be rotation. The motor may cause the tool to counter-rotate relative to rotation of the metering roller.

The given wall and another wall of the hopper may be nonparallel walls. A first distance between the nonparallel walls at an entrance to the hopper for the powder material may be wider relative to a second distance between the nonparallel walls at the opening, the opening being an exit from the hopper for the powder material.

The given wall may be coupled to a vibratory actuator configured to vibrate the given wall.

The vibratory actuator may be coupled to a mechanical component mounted to the given wall to cause lateral motion of the given wall via the mechanical component. The lateral motion may be in a direction parallel to an axis of rotation of the metering roller.

The mechanical component may be a push rod and the vibratory actuator may be a linear voice coil.

The metering apparatus may further comprise a lateral motion support coupled to the given wall for support and configured to flex during operation of the vibratory actuator in response to vibration of the given wall. The vibratory actuator may be coupled to a mechanical component mounted to the given wall to cause lateral motion of the given wall in a direction parallel to an axis of rotation of the metering roller. The lateral motion support may be further configured to restrict motion of the given wall, substantially, to the lateral motion.

The tool may be configured to contact the given wall.

The given wall may include a chamfer configured to enable the tool to reach the powder material as the powder material emerges from the hopper at the given wall due to the rotation of the metering roller.

The metering apparatus may further comprise at least two seals located at opposite ends of the given wall, the at least two seals coupled to an interior surface of the given wall and arranged to prevent the powder material from leaking out of the hopper due to lateral motion of the given wall.

The metering roller may be located above a leveler configured to traverse a powder bed in a traversal direction and the tool may be further configured to force flow of the powder material off the metering roller to deposit a metered amount of the powder material onto the powder bed in front of the leveler in the traversal direction.

The tool may be a wire configured to skive the powder material off of the metering roller.

According to yet another example embodiment, a method for metering a powder material in a three-dimensional (3D) printing system may comprise containing a powder material with walls of a hopper defining an opening sized and positioned to enable the powder material to flow therethrough; rotating a metering roller located beneath the opening of the hopper, the metering roller and a given wall of the walls of the hopper spaced apart by a gap therebetween at the opening, the gap in combination with the rotating of the metering roller causing a flow of the powder material to flow from under the given wall of the hopper at a substantially predictable rate; and forcing flow of the powder material off of the metering roller via a tool at the substantially predictable rate to supply the 3D printing system with the powder material for printing a 3D object, the tool positioned at the given wall where the flow emerges due to the rotation.

The tool may span at least a portion of a length of the metering roller, and the method may further comprise moving the tool in a manner that forces flow of the powder material off the metering roller, and wherein the moving may include rotating the tool.

The method may further comprise supporting the tool with a support rail that spans at least a portion of a length of the tool.

The method may further comprise moving the tool via a motor and the movement may include rotating the tool. The rotating may include counter-rotating the tool relative to the rotating of the metering roller.

The method may further comprise driving the given wall with a vibratory actuator configured to vibrate the given wall.

The vibratory actuator may be coupled to a mechanical component mounted to the given wall and wherein the method may further comprise activating the vibratory actuator to cause lateral motion of the given wall via the mechanical component.

The method may further comprise flexing a lateral motion support, coupled to the given wall, during operation of the vibratory actuator. The lateral motion support may be configured to restrict motion of the given wall, substantially, to lateral motion.

The method may further comprise contacting the powder material with the tool via a chamfer in the given wall as the powder material emerges from the hopper at the given wall due to the rotation of the metering roller.

The method may further comprise contacting the metering roller with the tool.

The method may further comprise preventing, via at least two seals located at opposite ends of the given wall and coupled to an interior surface of the given wall, the powder material from leaking out of the hopper due to lateral motion of the given wall.

The tool may be a sheet of metal or plastic material and the method may further comprise bending the sheet to press the sheet against a surface of the metering roller to skive the powder material off of the metering roller.

It should be understood that example embodiments disclosed herein can be implemented in the form of a method, apparatus, system, or computer readable medium with program codes embodied thereon.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 2A is a block diagram of an example embodiment of the system of FIG. 1B in which powder material is being dispensed onto a moveable surface.

FIG. 2B is block diagram of an example embodiment of the system of FIG. 1B in which the powder material does not flow due to absence of motion of the moveable surface.

FIG. 5 is a block diagram of an example embodiment of an angle of repose for a substantially flowable powder material.

FIG. 15 is a block diagram of an example internal structure of a computer in which various embodiments of the present disclosure may be implemented.

DETAILED DESCRIPTION

A description of example embodiments follows.

According to an example embodiment, a system for additive manufacturing of a three-dimensional (3D) object (also referred to interchangeably herein as a 3D printing system) includes: a build area (also referred to interchangeably herein as a top surface of a powder bed), powder leveler(s) (also referred to interchangeably herein as leveler(s), spreader(s), or powder spreader(s)), and printhead(s). According to the example embodiment, the leveler(s) may employ a unique metering and compacting system to precisely deposit metal injection molding (MIM) metal powder into a uniformly distributed layer with a height, for example, as small as 30 microns. The leveler(s) may be roller(s), and the powder material may be densified by the roller(s) for an even distribution, that is, a uniform height and uniform packing density, to form a layer of the metal powder.

The printhead(s) may employ a plurality of jets to selectively deposit droplets of a binder fluid to bind the layer of metal powder. Such droplets of the binder fluid may be small, for example, two trillionths of a liter (smallest droplet), and tens of millions of droplets may be deposited per second, binding the layer of the metal powder. Heat may be applied to speed up the binding process further and sinter the 3D object to form a final version of the 3D object.

Figure 1A:
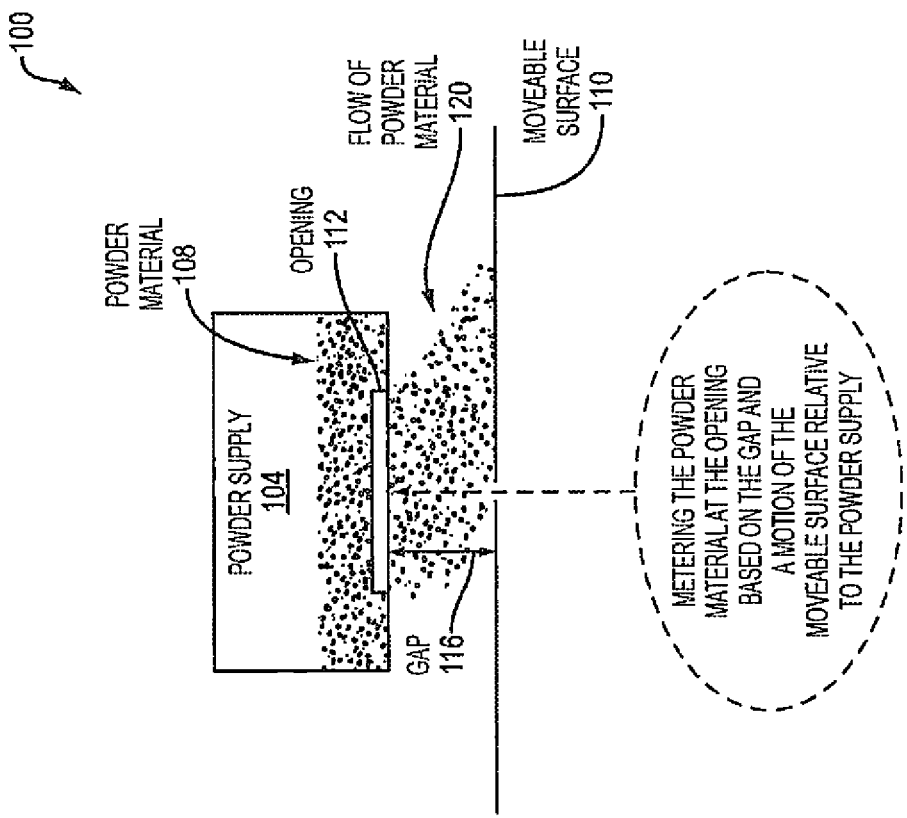
FIG. 1A is a block diagram of a powder supply and a moveable surface of a system for additive manufacturing of a three-dimensional (3D) object.

FIG. 1A is a block diagram 100 of an example embodiment of a powder supply 104 and a moveable surface 110 of a system 102 of FIG. 1B, disclosed below, for additive manufacturing of a three-dimensional (3D) object. The powder supply 104 is configured to store a powder material 108 and has an opening 112 for metering the powder material 108. An example embodiment meters the powder material 108 at the opening 112 of the powder supply 104 to produce a flow 120 of the powder material 108 away from the powder supply 104 and onto the moveable surface 110 located beneath the opening 112. The opening 112 and the moveable surface 110 are spaced apart by a gap 116 therebetween. The metering is advantageously based on the gap 116 and a motion of the moveable surface 110 relative to the powder supply 104. The motion enables the powder material 108 to flow from the powder supply 104, as disclosed further below. Absent the motion, the powder material 108 does not flow from the powder supply 104.

Figure 1B:
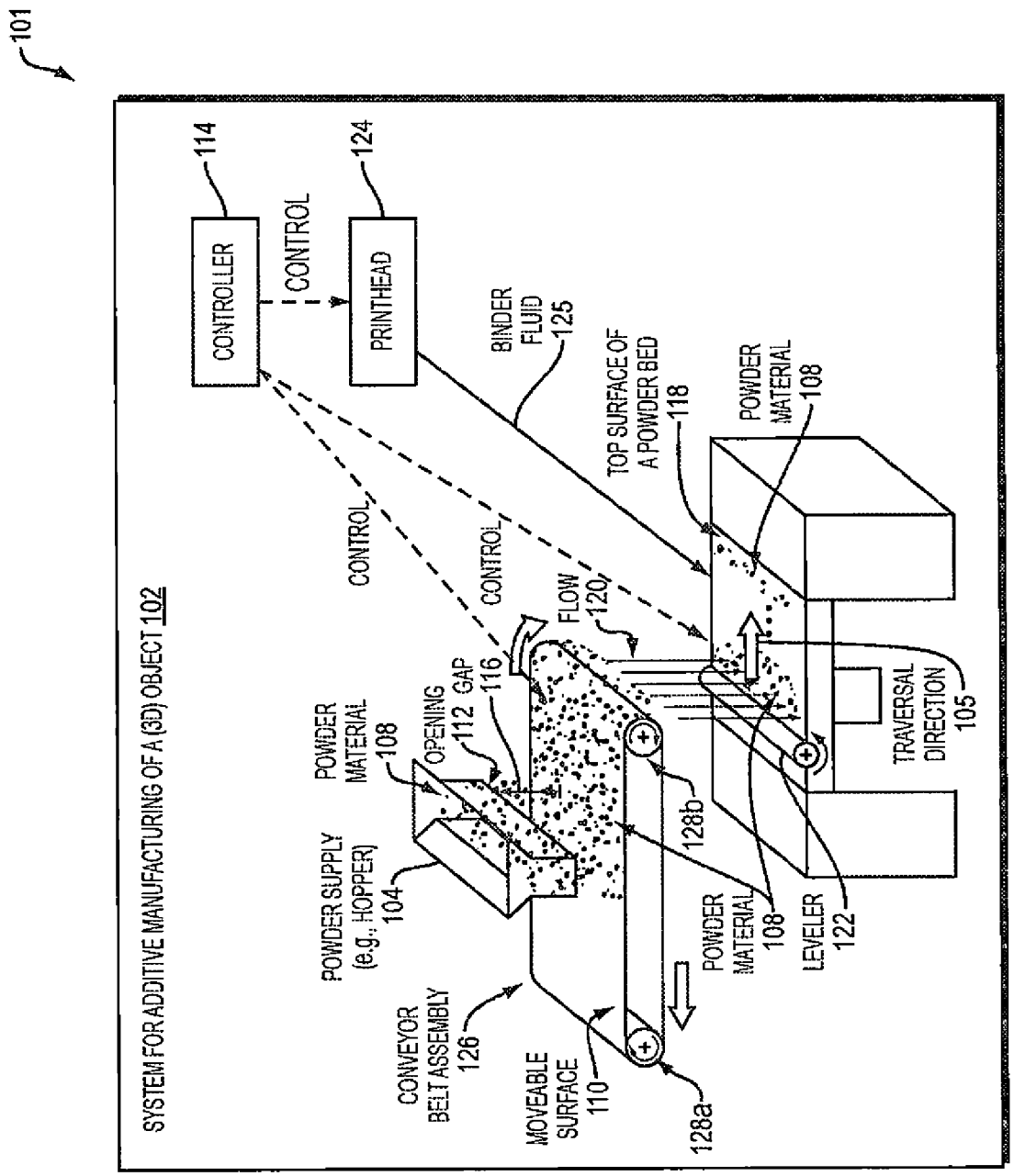
FIG. 1B is a block diagram an example embodiment of a system for additive manufacturing of a 3D object.

FIG. 1B is a block diagram 101 of an example embodiment of a system 102 for additive manufacturing of a 3D object (not shown). The system 102 comprises a powder supply 104 configured to store a powder material 108. The powder material 108 may be referred to interchangeably herein as build material or feedstock. The powder material 108 may be introduced into the powder supply 104 in any suitable manner. According to an example embodiment, the powder supply 104 may be a hopper, and the powder material 108 may be a metallic powder.

The system 102 comprises a moveable surface 110 located beneath an opening 112 of the powder supply 104, and a controller 114 configured to control a motion of the moveable surface 110 relative to the powder supply 104 to meter the powder material 108 at the opening 112 to produce a flow of the powder material 108 away from the powder supply 104 and onto the moveable surface 110. The opening 112 and the moveable surface 110 are spaced apart by a gap 116 therebetween. According to an example embodiment, the metering operation may be based on the gap 116 and the motion of the moveable surface 110. Such motion may enable the powder material 108 to flow from the powder supply 104. Absent the motion, the powder material 108 does not flow from the powder supply 108.

FIG. 2A is a block diagram 200 of an example embodiment of the powder material 208 being dispensed onto a moveable surface 210. FIG. 2A represents a runtime operation in which there is motion of the moveable surface 210 and the powder material 208 flows. FIG. 2A also represents a start-up condition prior to any runtime operation. According to the example embodiment, the gap 216 may be sized to enable control of the flow relative to motion and non-motion of the moveable surface 210 relative to the powder supply 204, or more specifically, relative to the opening 212 of the powder supply 204. In contrast to sand and other particles with a high flow-ability characteristic, the powder material 208 may be a substantially non-flowable material.

For example, the powder material 208 may clump and clog at the opening 212 of the powder supply 208. One type of powder of interest is the fine metal powder used in the metal injection molding (MIM) industry where a batch of powder typically has a wide range of powder sizes ranging, for example, from 2 to 35 microns. This wide range of particle sizes is advantageous in that it is less expensive to produce. The presence of significant content of fine particles also significantly aids in the sintering of the powder to full density—a later step in the process. Powders with distributions which include very fine particles typically do not flow particularly well. Depending upon a size of the gap 216, the powder material 208 may not flow, absent motion.

FIG. 2B is block diagram 211 of an example embodiment of the system of FIG. 1B in which the powder material 208 does not flow due to absence of motion of the moveable surface 210. An example embodiment may size the gap 216 such that motion enables flow of the powder material 208, such as in the example embodiment of FIG. 2A, disclosed above, whereas absence of such motion results in no flow, such as in the example embodiment of FIG. 2B. According to an example embodiment, the gap 216 may be sized such that it is larger than a diameter of a particle of the powder material 208, where the powder material 208 is composed of particles having the diameter. It should be understood that a formation of the powder material 208 on the moveable surface 210 may have angles more or less vertical with respect to the moveable surface 210 than illustrated in the example embodiment of FIG. 2B. Further, such angles may be symmetric or non-symmetric.

The diameter of the particle may be a lower threshold for size of the gap 216 (also referred interchangeably herein as the gap size) and may not be suitable as no flow may result in even in the presence of motion of the moveable surface 210. As such, the size of the gap 208 may be increased from the lower threshold to determine the size of the gap 216 at which motion enables flow of the powder material 208. Such a size of the gap 216 may be referred to herein as a gap setting with a value exceeding the diameter of the particle and triggering flow due to motion of the moveable surface 210. For example, a particle diameter may be 30 microns, whereas the gap setting to enable such control of the flow, that is flow in presence of motion and no flow, absent the motion, may be 0.5 mm. It should be understood that such dimensions are for illustrative purposes. Such motion in combination with an appropriately sized gap 216 may enable the powder material 208 to be dragged out of the powder supply 204 and onto the moveable surface 210, that is, the powder material 208 may not fall vertically from the powder supply 204 relative to the moveable surface 210 that may be substantially horizontal.

Turning back to FIG. 1B, the moveable surface 110 may be configured to deposit the flow 120 onto a top surface 118 of a powder bed to produce a metered amount of the powder material 108 on the top surface 118 of the powder bed. An example embodiment of the powder bed is disclosed further below, with reference to FIG. 12. The flow 120 may be deposited uniformly on the top surface 118 of the powder bed. The system 102 comprises a leveler 122 that is configured to level the metered amount across the top surface 118 of the powder bed to form a layer of the powder material 108.

According to an example embodiment, uniform deposition of the powder material 108 may be controlled based on the gap 116 between the opening 112 and the moveable surface 110. The gap 116 may be sized such that it enables the powder material 108, that may be a substantially non-flowable powder material, that is, susceptible to clumping, to flow, such that a height of the flow, the height being controlled as a function of the gap 116, is small enough to enable uniform deposition.

The system 102 comprises a printhead 124. The printhead 124 may be configured to apply a binder fluid 125 to at least one region (not shown) of the layer (not shown). The printhead 124 may include a discharge orifice (not shown) and, in certain implementations, may be actuated (e.g., through delivery of an electric current to a piezoelectric element in mechanical communication with the binder fluid) to dispense the binder fluid 125 through the discharge orifice (not shown) to the layer of powder spread across the top surface 118 of the powder bed. The binder fluid 125 may be configured to cause the layer to become bonded at the at least one region (not shown) to form a bonded layer of the 3D object (not shown).

The controller 114 may be further configured to control motion of the leveler 122, release of the binder fluid 125 from the printhead 124, and a vertical movement of the top surface 118 of the powder bed. The controller 114 may be further configured to actuate the printhead 124 to deliver the binder fluid from the printhead 124 to each layer of the powder in a controlled two-dimensional pattern as the printhead 124 moves across the top surface 118 of the powder bed.

It should be appreciated that movement of the printhead 124, and actuation of the printhead 124 to deliver the binder fluid 125, may be done in coordination with movement of the leveler 122 across the powder bed. For example, the leveler 122 can spread a layer of the powder material 108 across the top surface 118 of the powder bed, and the printhead 124 may deliver the binder fluid in a controlled two-dimensional pattern to the layer of the powder spread across the top surface 118 of the powder bed to form a layer of a 3D object (not shown). Such operations may be repeated (e.g., with a controlled two-dimensional pattern for each respective layer) in sequence to form subsequent layers until, ultimately, the 3D object is formed in the powder bed, such as the powder bed 1221 of FIG. 12, disclosed further below.

According to an example embodiment, the deposit, level, and apply operations may be sequential operations for a given layer. For example, an entire amount of powder material for the given layer may be deposited, followed by leveling of the entire amount, followed by application of binder fluid to the leveled layer. According to another example embodiment, at least two of the deposit, level, and apply operations may be operations that are activated concurrently. For example, depositing of powder material may be activated while leveling of powder material is also activated, the leveling following the depositing. According to yet another example embodiment, the deposit, level, and apply operations may be operations that are activated concurrently.

It should be understood that a direction for the deposit, level, or apply operations may be in any suitable direction relative to the top surface 118 of the powder bed. Further, such direction may be uni- or bi-directional.

According to an example embodiment, the powder supply 104 and the moveable surface 110 may be configured to move across the top surface 118 of the powder bed as a unit. The leveler 122 may be configured to traverse the top surface 118 of the powder bed in a traversal direction 105. The unit may be configured to traverse the top surface 118 of the powder bed in the traversal direction 105 and deposit the flow 120 onto the top surface 118 of the powder bed ahead of a traversal by the leveler 122. The unit may include the printhead 124 and the printhead 124 may be configured to apply the binder fluid following the traversal by the leveler 122.

According to an example embodiment, the leveler 122 and the printhead 124 may be configured to traverse the top surface 118 of the powder bed as a unit. The printhead 124 may be configured to apply the binder fluid 125 following the traversal by the leveler 122.

Figure 3:
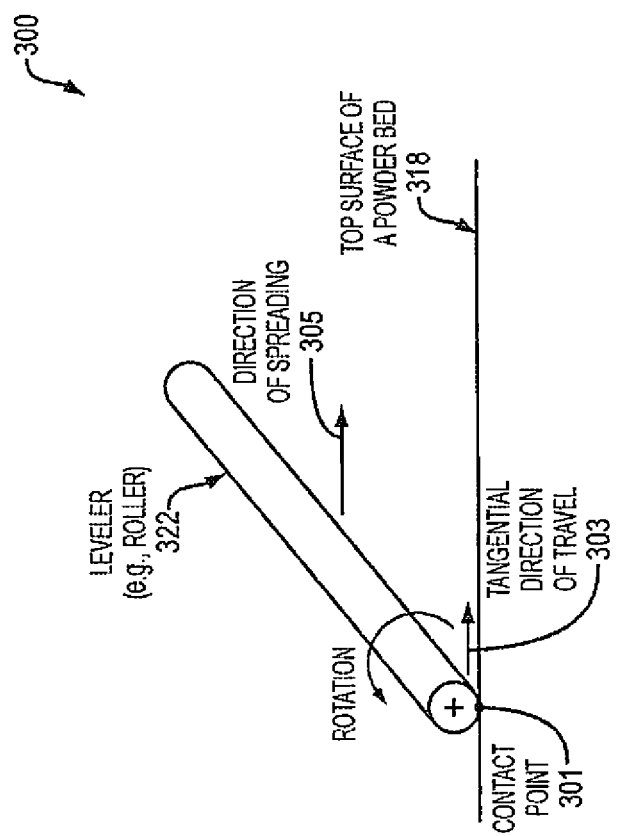
FIG. 3 is a block diagram of an example embodiment of a leveler and an example embodiment of a tangential direction of travel.

FIG. 3 is a block diagram 300 of an example embodiment of a leveler, such as the leveler 122 of FIG. 1B, disclosed above, and an example embodiment of a tangential direction of travel 303. In the example embodiment of the leveler, the leveler 322 may be a roller configured to traverse the top surface 318 of a powder bed (not shown) and rotate such that, at a contact point 301 between the roller, that is, the leveler 322, and the top surface 318 of the powder bed, the tangential direction 303 of travel of the contact point 301 with the top surface 318 of the powder bed is in a same direction as traversal of the roller. As such, the leveler 322 may be understood as rolling in reverse of a direction of traversal or a direction 305 of spreading the powder material across the top surface 318 of the powder bed.

Turning back to FIG. 1B, the moveable surface 110 may be a belt, such as a belt included in a conveyor belt assembly 126. The conveyor belt assembly 126 may further include pulleys, such as a first pulley 128a and second pulley 128b, or rollers for moving the belt. Such pulleys may be sized to ensure a well-defined point at which the powder material 108 slides off the belt. For example, the pulleys may be sized such that the belt makes close to a 90 degree bend to define the line where the powder material 108 drops onto the top surface 118 of the powder bed.

Figure 4A:
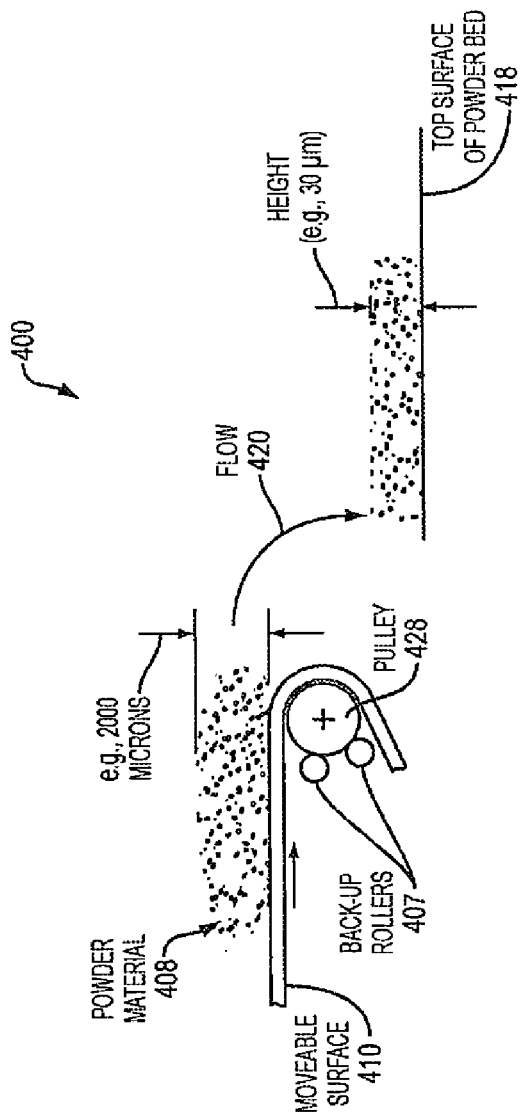
FIG. 4A is block diagram of an example embodiment of a pulley in a conveyor belt assembly.

FIG. 4A is block diagram 400 of an example embodiment of a pulley 428 in a conveyor belt assembly (not shown), such as the conveyor belt assembly 126 of FIG. 1B, disclosed above. As disclosed in FIG. 4A, the conveyor belt assembly 126 may further include at least one back-up roller 407. The at least one back-up roller 407 may be located behind at least one pulley 428 of the pulleys, such as the first pulley 128a and 128b of FIG. 1B, to support the at least one pulley 428 and to enable a smaller radius for the at least one pulley 428. The smaller radius may enable cleaner separation of the flow 420 from the moveable surface 410 relative to a larger radius.

Further, by sizing the radius of the pulley 428 to be as small as possible, uniformity may be achieved by enabling the flow 420 of the powder material 408 to fall off the moveable surface 410 in small clumps, and in a uniform manner, obviating metering of a large mound onto the top surface 418 of the powder bed (not shown). As such clumps get smaller; a more desirable continuous metering may be achieved.

Figure 4B:
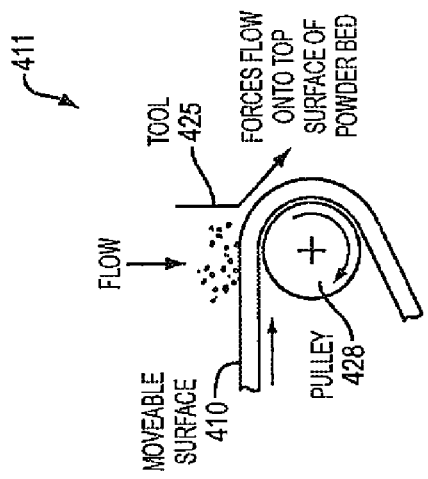
FIG. 4B is block diagram of another example embodiment of a pulley in a conveyor belt assembly.

FIG. 4B is block diagram 411 of another example embodiment of the pulley 428 in a conveyor belt assembly (not shown). In the example embodiment, a tool 425 may be configured to force the flow 420 of the powder material 408 off the moveable surface 410 and onto the top surface 418 of the powder bed. The moveable surface 410 is a roller that may have a roughened surface. The tool 425 may be at least one of an air knife, a razor, a wire, or a rotatable surface with brushes, an adjustable blade, or any other suitable tool for forcing the powder material 408 off the moveable surface. The moveable surface 410 may be roughened in any suitable way, for example, the moveable surface 410 may have machining marks applied thereto, may roughened by contacting an abrasive surface, roughened via honing or photomachining, covered with an abrasive wrap, knurled, or roughened in any other suitable way.

FIG. 5 is a block diagram 500 of an example embodiment of an angle of repose 511 for a substantially flowable powder material 508. It should be understood that the angle of repose 511 may be more or less vertical than illustrated, based on flowability of the powder material 508, as disclosed below. In the example embodiment, there is a gap 516 between the opening 512 of the powder supply 504 and the moveable surface 510. The powder material 508 is substantially flowable; however, not as flowable as a liquid. Since the powder material 508 flows, but is not as flowable as a liquid, the gap 516 causes the substantially flowable powder material 508 to stop flowing, absent motion of the moveable surface 510, and even more so with powder material that is clumpy. Even with a freely flowing powder material, such as the powder material 508 of FIG. 5, the flow stops absent motion of the moveable surface 510 due to the gap 516. As disclosed in FIG. 5, the powder material 508 may be dispensed from the opening 512 and form the angle of repose 511 with the moveable surface 510, that may be a belt. The angle of repose 511 may further enable a non-contact seal between the powder material 508 and the belt. As disclosed above, the gap 516 causes the substantially flowable powder material 508 to stop flowing, absent motion of the belt. The belt may be a substantially planar surface that is configured to move at a specified rate. All granular materials have a characteristic angle, termed the angle of repose, which refers to the angle with a horizontal plane on which a free standing pile of the granular material would form if allowed to slowly fall from a narrow orifice onto the plane. Such an angle is a basic property of a material having a given particle size distribution and a given particle shape distribution. For less flowable powders, the angle of repose is higher—that is, the side walls of a pile of powder are closer to vertical. For the powders which have a wide side distribution and include very fine particles, the side walls may sometimes be close to vertical. It should be understood that the angle of repose may be non-symmetric with respect to the side walls.

According to an example embodiment, the angle of repose 511 formed by the powder material 508 and the belt enables a non-contact seal between the volume of the powder material 508 and the belt. As such, no physical seal or deformation of the belt is required to prevent the powder material 508 from continuously flowing because the angle of repose 511, which is determined by the shape and size distributions of the particles forming the powder material 508, enables the non-contact seal preventing such a continuous flow. Due to the angle of repose 511, a contact seal formed via a physical component, such as a stopper, or deformation of the belt, such as a raised lip, groove, or channel, is not necessary, as a seal between the volume of the powder material 508 with the moving belt is a non-contact seal enabled by the angle of repose 511. However, it should be understood that since the powder material 508 is not as flowable as a liquid, the gap 516 causes the substantially flowable powder material 508 to stop flowing, absent motion of the belt. An extent of the volume of the powder material 508 may be further limited by the angle of repose 511.

Turning back to FIG. 1B, according to an example embodiment, the moveable surface 110 may be at least one roller, such as the roller 610 disclosed in FIG. 6, below.

Figure 6:
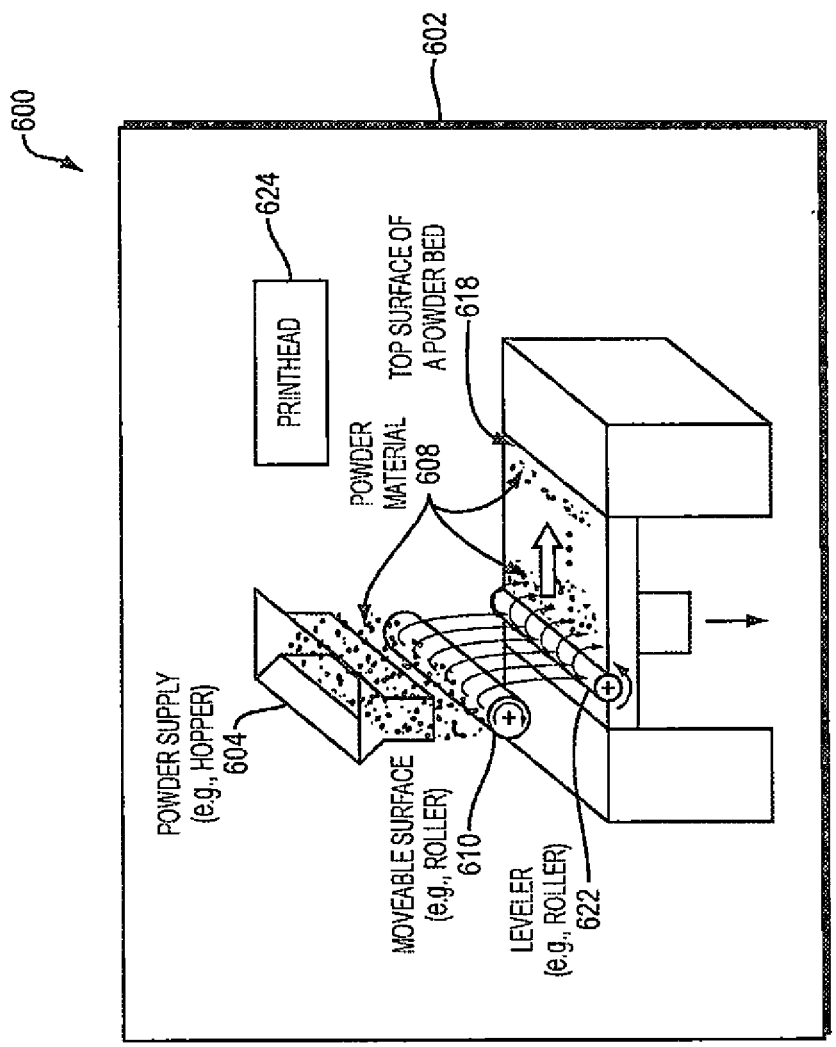
FIG. 6 is a block diagram of an example embodiment of the system of FIG. 1B in which the moveable surface is a roller.

FIG. 6 is a block diagram 600 of an example embodiment of the system 102 of FIG. 1B in which the moveable surface 110 is a roller 610. Similar to the system 102 of FIG. 1B, disclosed above, the system 602 comprises a powder supply 604 configured to store a powder material 608. The system 602 comprises a moveable surface 610 located beneath an opening of the powder supply 604, and the moveable surface 610 is a roller, in the example embodiment. The roller 610 may be configured to deposit the flow onto a top surface 618 of a powder bed to produce a metered amount of the powder material 608 on the top surface 618 of the powder bed. The flow may be deposited uniformly on the top surface 618 of the powder bed. The system 602 comprises a leveler 622 that is configured to level the metered amount across the top surface 618 of the powder bed to form a layer of the powder material 608 and a printhead 624 for applying the binder fluid thereto. According to an example embodiment, the roller 610 may include a notch for catching and releasing the powder material 608, as disclosed further below with regard to FIG. 9.

Turning back to FIG. 1B, according to another example embodiment, the moveable surface 110 may be a pair of rollers configured to rotate in opposite directions, such as the pairs of rollers disclosed in FIG. 7A, FIG. 7B, FIG. 8, and FIG. 10, below.

Figure 7A:
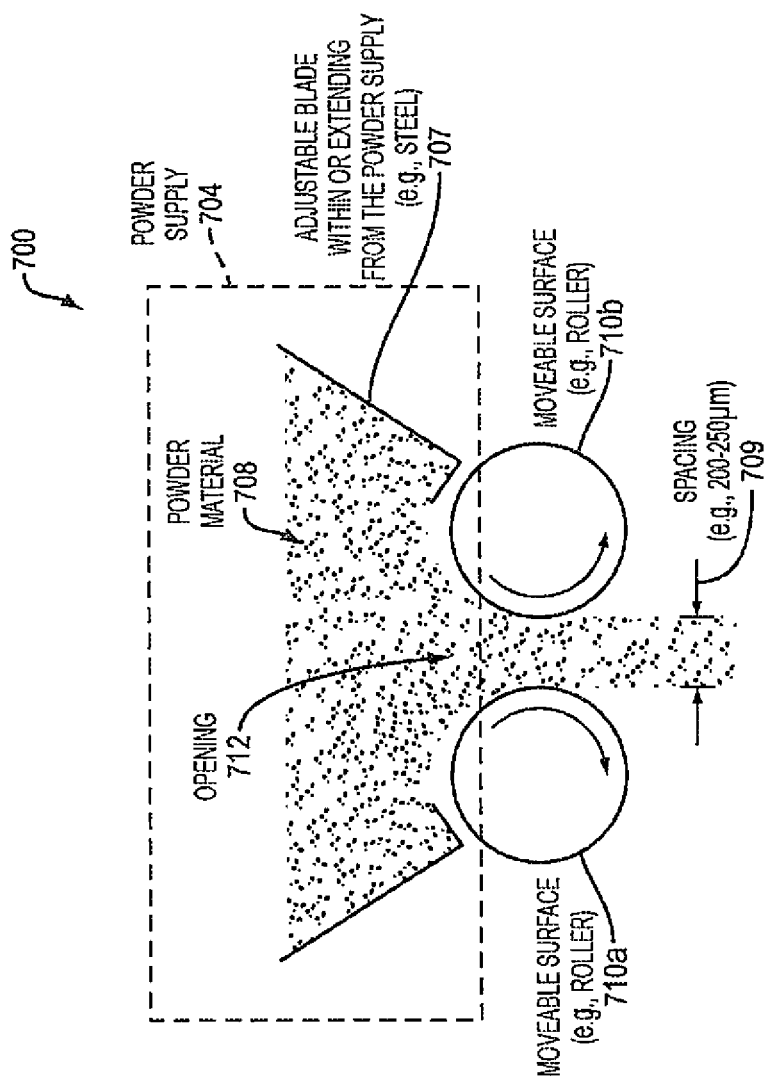
FIG. 7A is a block diagram of an example embodiment of a pair of rollers that may be employed as a moveable surface.

FIG. 7A is a block diagram 700 of an example embodiment of a pair of rollers including a first roller 710a and a second roller 710b that may be employed as a moveable surface, such as the moveable surface 110 of FIG. 1B, disclosed above. According to the example embodiment, at least one adjustable blade 707 may be employed within or extending from the powder supply 704. According to an example embodiment, the at least one adjustable blade 707 may be composed of steel. In the example embodiment, the first roller 710a and the second roller 710b may be configured to rotate in opposite directions. Such motion may enable the powder material 708 to flow from the powder supply 704 onto a top surface of a powder bed (not shown), such as the top surface 118 of the powder bed of FIG. 1B.

A spacing 709 between the pair of rollers may be, for example, 200-250 microns whereas a particle size of the powder material 708 may be, for example, 2-30 microns. Such powder material 708 may be substantially non-flowable and may clump and clog at the opening 712 of the powder supply 704 absent the motion that may agitate such substantially non-flowable material such that the powder material 708 does flow. Absent the motion, the powder material 708 may not flow between the pair of rollers 710a and 710b. As disclosed above, the pair of rollers may be configured to rotate in opposite directions. Such control over the flow of the powder material 708 may be a function of the gap between the opening of the powder supply and the moveable surface and the motion of the moveable surface as well as the spacing 709 between the pair of rollers. For example, with larger spacing in excess of 250 microns the powder material 708 may continuously flow, whereas with smaller spacing between the pair of rollers, such as below 200 microns, the powder material 708 may not flow at all, even in the presence of the motion. According to an example embodiment, the first roller 710a and the second roller 710b may include respective notches for catching and releasing the powder material 708, as disclosed further below with regard to FIG. 10. It should be understood that rotation of the first roller 710a and the second roller 710b may be opposite to that illustrated in FIG. 7A, and that configuration of such rotational direction may be based on coarseness of the powder material 708.

Figure 7B:
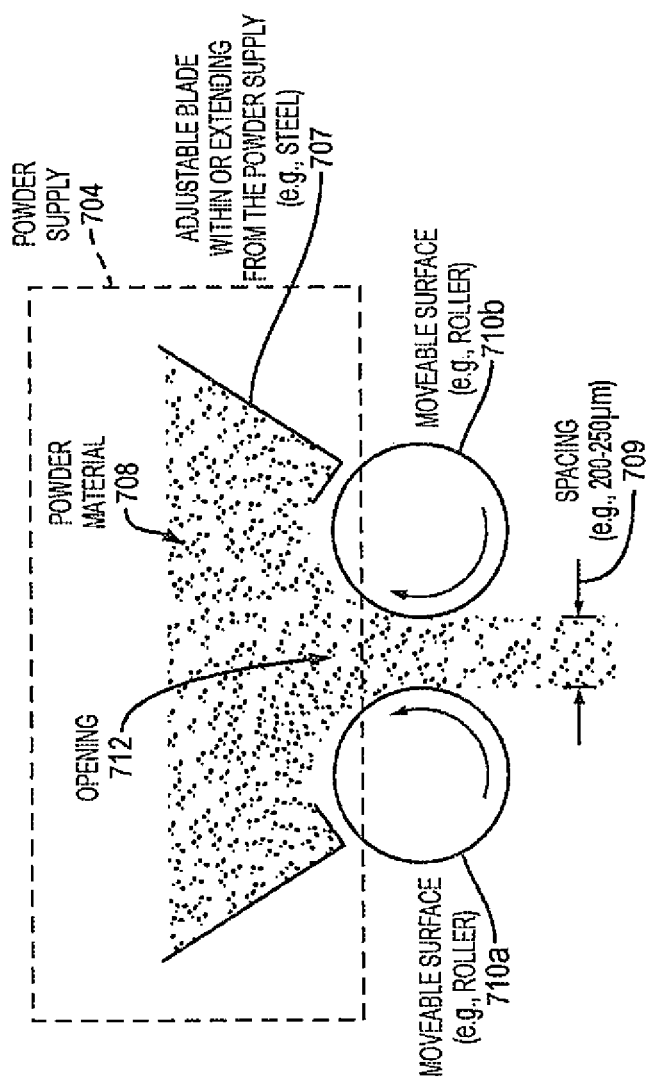
FIG. 7B is a block diagram of another example embodiment of a pair of rollers that may be employed as a moveable surface.

FIG. 7B is a block diagram of another example embodiment of a pair of rollers. In the example embodiment of FIG. 7B, the first roller 710a and the second roller 710b are configured to rotate in directions that are opposite to that illustrated in FIG. 7A, disclosed above.

Figure 8:
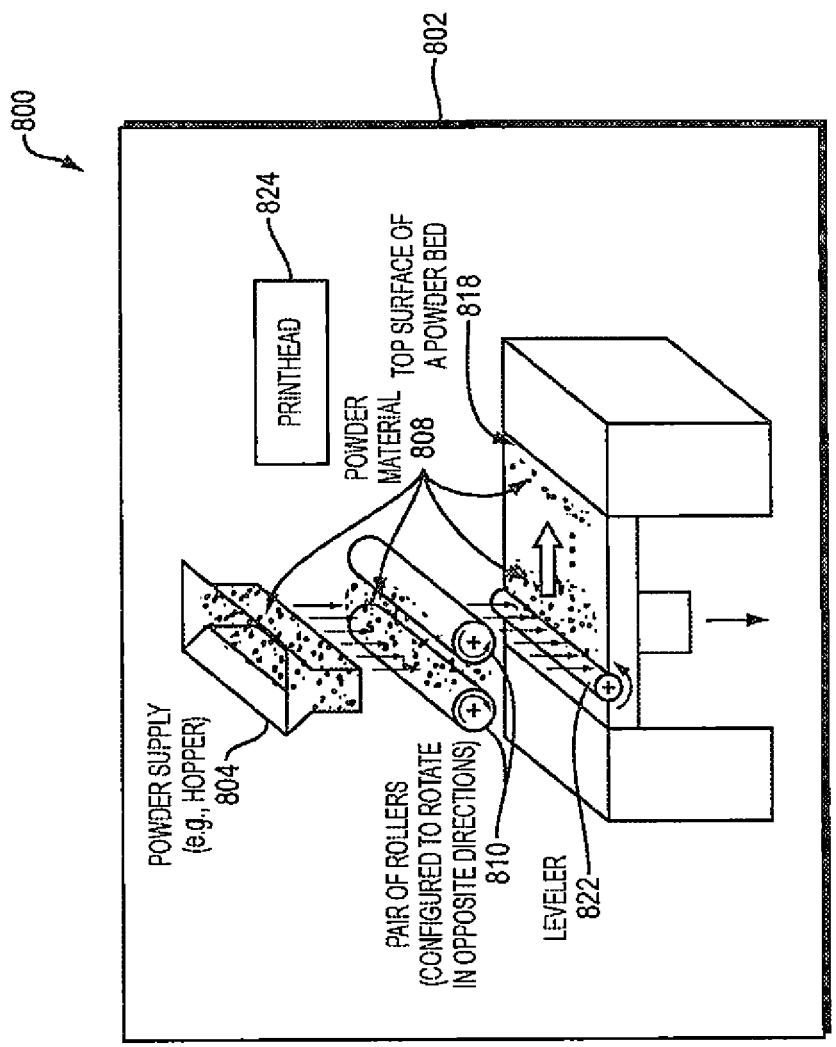
FIG. 8 is a block diagram an example embodiment of a system for additive manufacturing of a 3D object in which the moveable surface is a pair of rollers.

FIG. 8 is a block diagram 800 an example embodiment of a system 802 for additive manufacturing of a 3D object in which the moveable surface is a pair of rollers 810, such as the first roller 710a and the second roller 710b of FIG. 7A and FIG. 7B, disclosed above. Similar to the system 102 of FIG. 1B, disclosed above, the system 802 comprises a powder supply 804 configured to store a powder material 808. The system 802 comprises a moveable surface 810 located beneath an opening of the powder supply 804. The moveable surface 810 is a pair of rollers, in the example embodiment.

The pair of rollers 810 may be configured to deposit the flow onto a top surface 818 of a powder bed to produce a metered amount of the powder material 808 on the top surface 818 of the powder bed. The flow may be deposited uniformly on the top surface 818 of the powder bed. The system 802 comprises a leveler 822 that is configured to level the metered amount across the top surface 818 of the powder bed to form a layer of the powder material 808 and a printhead 824 for applying the binder fluid thereto. According to the example embodiment, the pair of rollers 810 may be configured to rotate in opposite directions. The motion may enable the powder material 808 to flow between the pair of rollers 810. According to an example embodiment, each roller of the pair of rollers 810 may include respective notches for catching and releasing the powder material 808, as disclosed further below with regard to FIG. 10.

Figure 9:
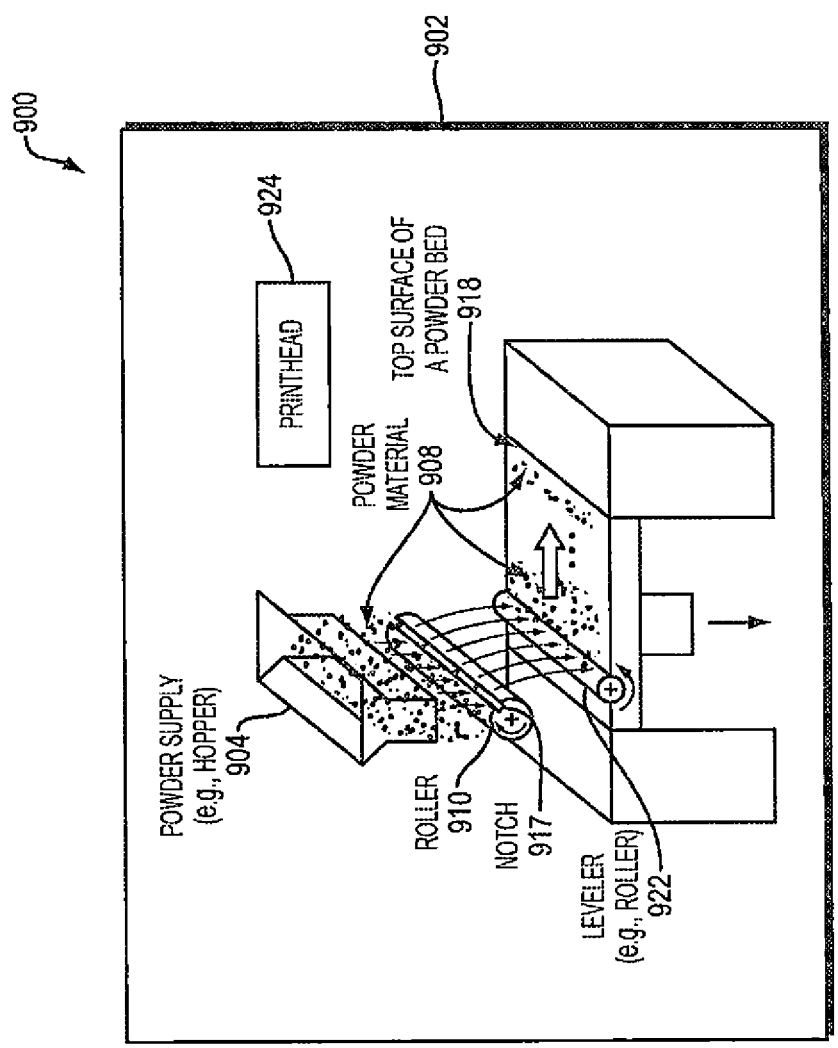
FIG. 9 is a block diagram of another example embodiment of a system for additive manufacturing of a 3D object in which the moveable surface is a roller.

FIG. 9 is a block diagram 900 of another example embodiment of a system 902 for additive manufacturing of a 3D object in which the moveable surface is a roller 910. Similar to the system 102 of FIG. 1B, disclosed above, the system 902 comprises a powder supply 904 configured to store a powder material 908. The system 902 comprises a moveable surface 910 located beneath an opening of the powder supply 904. The moveable surface 910 is a roller, in the example embodiment. The roller 910 may be configured to deposit the flow onto a top surface 918 of a powder bed to produce a metered amount of the powder material 908 on the top surface 918 of the powder bed. The flow may be deposited uniformly on the top surface 918 of the powder bed. The system 902 comprises a leveler 922 that is configured to level the metered amount across the top surface 918 of the powder bed to form a layer of the powder material 908 and a printhead 924 for applying the binder fluid thereto. The motion of the roller 910 may enable the powder material 908 to flow from the powder supply 904. According to the example embodiment, the roller 910 may include the notch 917 for catching and releasing the powder material 908.

Figure 10:
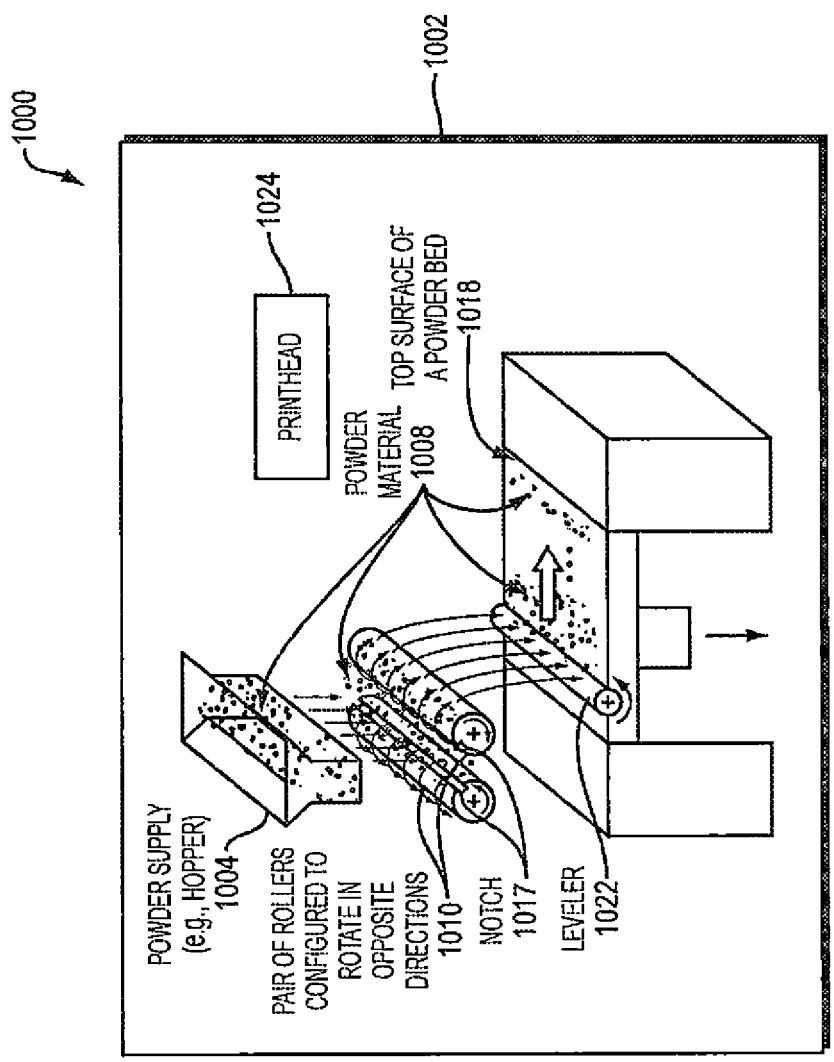
FIG. 10 is a block diagram of another example embodiment of a system for additive manufacturing of a 3D object in which the moveable surface is a pair of rollers.

FIG. 10 is a block diagram 1000 of another example embodiment of a system 1002 for additive manufacturing of a 3D object in which the moveable surface is a pair of rollers 1010. Similar to the system 102 of FIG. 1B, disclosed above, the system 1002 comprises a powder supply 1004 configured to store a powder material 1008. The system 1002 comprises a moveable surface 1010 located beneath an opening of the powder supply 1004. The moveable surface 1010 is a pair of rollers, in the example embodiment. The pair of rollers 1010 may be configured to deposit the flow onto a top surface 1018 of a powder bed to produce a metered amount of the powder material 1008 on the top surface 1018 of the powder bed. The flow may be deposited uniformly on the top surface 1018 of the powder bed.

The system 1002 comprises a leveler 1022 that is configured to level the metered amount across the top surface 1018 of the powder bed to form a layer of the powder material 1008 and a printhead 1024 for applying the binder fluid thereto. According to the example embodiment, the pair of rollers 1010 may be configured to rotate in opposite directions. The motion may enable the powder material 1008 to flow between the pair of rollers 1010. According to an example embodiment, each roller of the pair of rollers 1010 may include a respective notch 1017 for catching and releasing the powder material 1008.

Figure 11A:
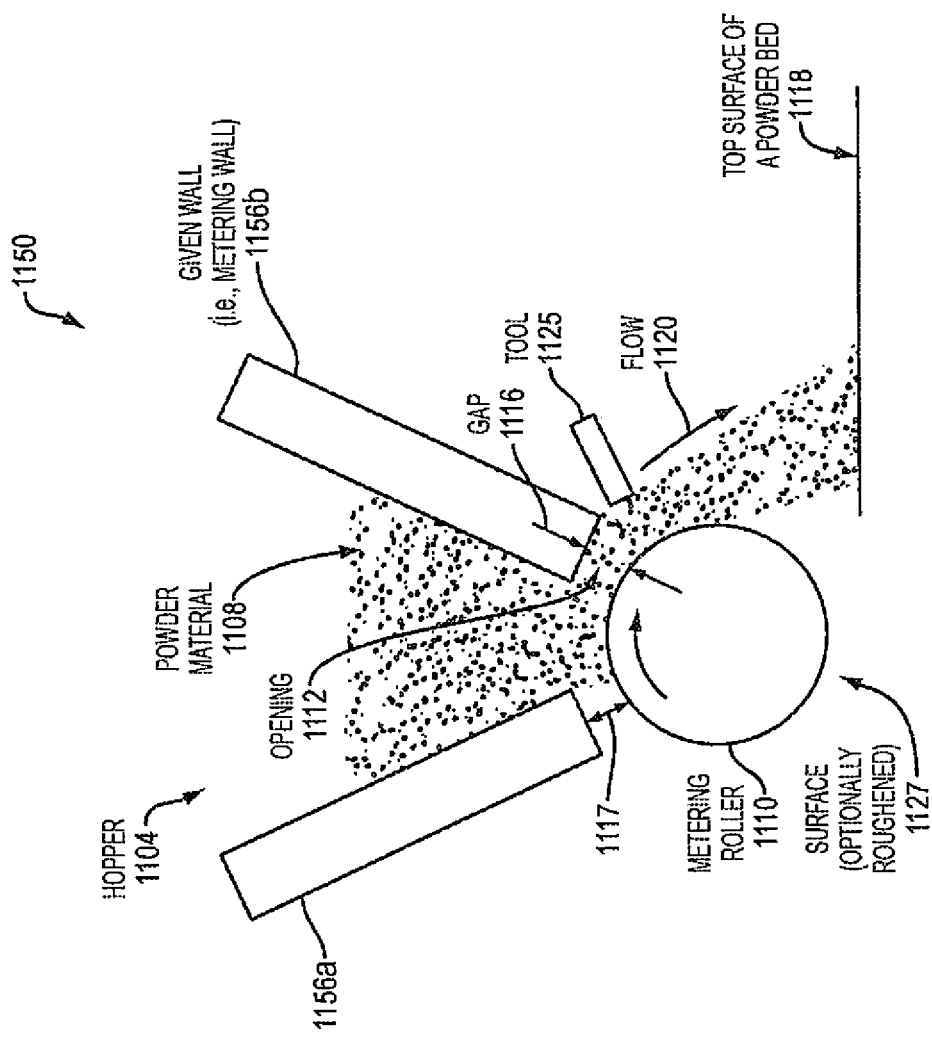
FIG. 11A is block diagram of a cross-sectional view of an example embodiment of a metering apparatus.

FIG. 11A is block diagram of a cross-sectional view of a metering apparatus 1150 for metering a powder material 1108 in a three-dimensional (3D) printing system (not shown). The metering apparatus 1150 comprises a hopper 1104, a metering roller 1110 with a surface 1127, and a tool 1125. The hopper 1104 has walls 1156a and 1156b configured to contain the powder material 1108 and defining an opening 1112 sized and positioned to enable the powder material 1108 to flow therethrough. The metering roller 1110 with the surface 1127 is located beneath the opening 1112 of the hopper 1104. The metering roller 1110 and a given wall 1156b of the walls of the hopper 1104 may be spaced apart by a gap 1116 therebetween at the opening 1112, the gap 1116 in combination with rotation of the metering roller 1110 causing a flow 1120 of the powder material 1108 to flow from under the given wall 1156b of the hopper 1104 at a substantially predictable rate. The tool 1125 may be configured to force flow of the powder material 1108 off the surface 1127 of the metering roller 1110 at the substantially predictable rate to supply the 3D printing system (not shown) with the powder material 1108 for printing a 3D object (not shown). According to an example embodiment, a surface of the metering roller 1110 may be a roughened surface. Regardless of whether the surface 1127 is roughened, the powder material 1108 may not readily flow off the surface 1127. The tool 1125 may be positioned at the given wall 1156b where the flow emerges due to the rotation. The given wall 1156b may be referred to interchangeably herein as a metering wall or a vibrating wall.

The given wall 1156b may be a particular wall toward which a conveying surface of the metering roller 1110 is configured to rotate. As such, the given wall 1156b may switch between the walls 1156a and 1156b dependent on a direction of rotation of the metering roller 1110. The conveying surface may be an upper surface of the metering roller 1110, the upper surface changing based on rotation of the metering roller 1110. The conveying surface transports the powder material 1108 such that the powder material 1108 exits the hopper 1104 from underneath the given wall 1156b. According to an example embodiment, the metering apparatus 1150 may rotate the metering roller 1110 in a different direction according to a traversal direction across the powder bed. Alternatively, the metering apparatus 1150 may be one of multiple metering apparatus each configured with a metering roller 1110 configured to rotate in opposite directions from one another.

It should be understood that the opposite facing wall 1156a, that faces opposite of the given wall 1156b in the hopper 1104, may be spaced apart from the metering roller 1110 by a distance 1117 therebetween at the opening 1112, and that the distance 1117 may be same or different distance relative to the gap 1116. The 3D object may be any suitable 3D object, such as the 3D object 1229 of FIG. 12, disclosed further below. The tool 1125 may force the powder material 1108 off the metering roller 1110 and onto a top surface 1118 of a powder bed. An example embodiment of the powder bed is disclosed with reference to FIG. 12, below. The 3D printing system may be any suitable additive manufacturing system, such as any of the additive manufacturing systems disclosed herein.

The surface 1127 of the metering roller 1110 may be a roughened surface. For example the surface 1127 may have machining marks applied thereto, may roughened by contacting an abrasive surface, roughened via honing or photomachining, covered with an abrasive wrap, knurled, or roughened in any other suitable way. If roughened, the surface 1127 may be a textured surface formed in a suitable way, such as via knurling or any other suitable mechanism that roughens the surface 1127 of the metering roller 1110, such as disclosed above.

According to an example embodiment, the tool 1125 may be configured to contact the metering roller 1110, the given wall 1156b, or a combination thereof.

The tool 1125 may be any suitable tool that forces the flow 1120 of the powder material 1108 off the metering roller 1110. For example, the tool 1125 may be a pneumatic tool that is configured to move air towards the surface 1127 of the metering roller 1110 in a manner that forces the powder material 1108 off the surface 1127 and onto the top surface 1118 of the powder bed. The tool 1125 may be moveable. For example the tool 1125 may be configured to traverse along a portion of a length of the metering roller 1110 or may be configured to rotate. Alternatively, the tool 1125 may not be moveable.

The tool 1125 may be configured to span at least a length of the metering roller 1110 that is configured to receive the powder material 1108. For example, the tool 1125 may have a tool length that spans at least the length of the metering roller 1110 that is configured to receive the powder material 1108. Alternatively, the tool length may be independent of the length of the metering roller 1110 that is configured to receive the powder material 1108 and the tool 1125 may be configured to traverse along the metering roller 1110 for at least the length of the metering roller 1110 that is configured to receive the powder material 1108.

According to an example embodiment, the tool 1125 may be a brush, such as disclosed further below with reference to FIG. 11B. The brush may have bristles of any suitable material, such as nylon. The brush may be configured such that rotation of the brush causes the bristles to force the powder material 1108 off of the surface 1127. Alternatively, the brush may not be configured to rotate and may be configured to traverse along a portion of a length of the metering roller 1110 to force the powder material 1108 off of the surface 1127. As disclosed above, the tool 1125 may be any suitable tool that forces flow of the powder material off the surface 1127 of the metering roller 1110. As such, the tool 1125 need not have brushes and need not be configured to rotate.

The metering apparatus 1150 may further comprise a motor (not shown) configured to cause rotation of the brush 1125, such as the motor 1153 of FIG. 11D, disclosed further below. According to an example embodiment, the tool 1125 may be further configured to counter-rotate relative to the rotation of the metering roller 1110 via the motor (not shown).

Rotation of the metering roller 1110 may be controlled by another motor (not shown) that may be a separate motor from the motor causing rotation of the tool 1125. Rotation of the metering roller 1110 and the tool 1125 may be driven via pulleys (not shown) and gears (not shown) that may be coupled, respectively, to motors employed for driving rotation of the metering roller 1110 and the tool 1125. Such rotation may be selectively activated, and the motors may be driven via control signals driven by a controller (not shown), such as the controller 1214 of FIG. 12, disclosed further below.

It should be understood that the hopper 1104 includes walls in addition to the walls 1156a and 1156b, that is, the walls 1156c and 1156d of FIG. 11G, disclosed further below. According to an example embodiment, pairs of opposite facing walls of the hopper 1104, such as the walls 1156a and 1156b, and the walls 1156c and 1156d, may be nonparallel walls. Alternatively, such pairs of opposite facing walls may be parallel walls. Nonparallel walls may be employed to maximize an amount of the powder material 1108 contained by the hopper 1104.

According to an example embodiment, at least one of the walls 1156a and 1156b may be configured to vibrate, accelerating motion of the powder material 1108 as the powder material 1108 falls down toward the opening 1112 and, thus, down toward the metering roller 1110. According to an example embodiment, such vibration may be caused by a vibratory actuator, such as the vibratory actuator 1151 of FIG. 11C, disclosed further below. The vibratory actuator 1151 may be any suitable vibratory actuator, such as an electro-mechanical, pneumatic, or hydraulic actuator configured to vibrate the given wall 1156b. According to an example embodiment, the vibratory actuator 1151 may be a linear voice coil. According to an example embodiment, the mechanical component 1151 may be a push rod. According to an example embodiment, such vibration may be caused by a motor (not shown) and crank arm (not shown) or a motor and cam (not shown). For example, a crank arm engaging in a circular motion may be coupled to the given wall 1156b or the tool 1125 that may be a sheet, as disclosed below with regard to FIG. 11P, via a connecting rod (not shown) and such circular motion may be translated into linear motion of the connecting rod, resulting in lateral motion of the given wall 1156b or the sheet, such as the lateral motion 1159 that may be in a direction that is substantially parallel to an axis of rotation 1165 of the metering roller 1110, as disclosed further below with reference to FIG. 11C. While such vibration may include substantially lateral motion, such vibration may also include motion in other directions but with amplitudes of a much lesser degree relative to the lateral motion.

The metering roller 1110 may be located above a leveler (not shown), such as a blade or roller, disclosed above. According to an example embodiment, the metering roller 1110 may be located directly above the leveler. Alternatively, the metering roller 1110 may be located in a plane above a plane of the leveler but not located directly above the leveler. The leveler may be configured to traverse the powder bed in a traversal direction and the tool 1125 may be further configured to force flow of the powder material 1108 off the metering roller 1110 to deposit a metered amount of the powder material 1108 onto the powder bed in front of the leveler in the traversal direction. According to an example embodiment, the metering roller 1110 may be located directly above the leveler such that a center line of each of the metering roller 1110 and the leveler are aligned. Alternatively, such center lines may not be aligned. The metered amount may be deposited as a pile in front of the leveler or distributed along the powder bed in front of the leveler. According to an example embodiment, metering and leveling may be activated concurrently. Alternatively, metering of the powder material 1108 may be such that a metered amount for an entire given layer is deposited prior to activation of the leveler to level the given layer. Example embodiments disclosed herein enable a reliable metering of the powder material 1108 such that leveling and metering operations for the given layer may be activated concurrently or may be sequential operations.

Figure 11B:
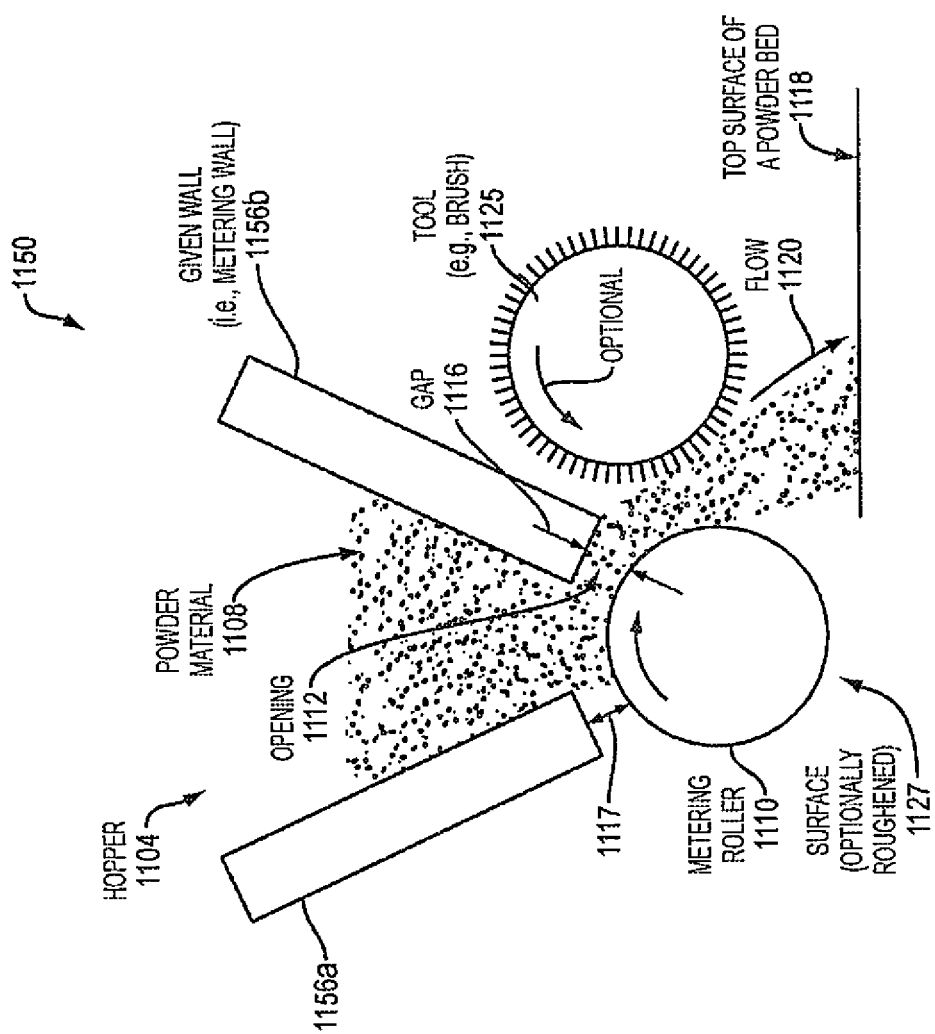
FIG. 11B is block diagram of a cross-sectional view of the metering apparatus of FIG. 11A in which the tool is a brush.

FIG. 11B is block diagram of a cross-sectional view of the metering apparatus 1150 of FIG. 11A in which the tool 1125 is a brush that may be referred to interchangeably herein as a "sweeper." According to the example embodiment of FIG. 11B, the tool 1125 is a brush that may span at least a portion of a length of the metering roller 1110 and is arranged in contact with the metering roller 1110, the brush being configured to rotate in a manner that forces flow of the powder material 1108 off the metering roller 1110. According to an example embodiment, the brush may be a flexible, spiral, nylon brush.

Figure 11C:
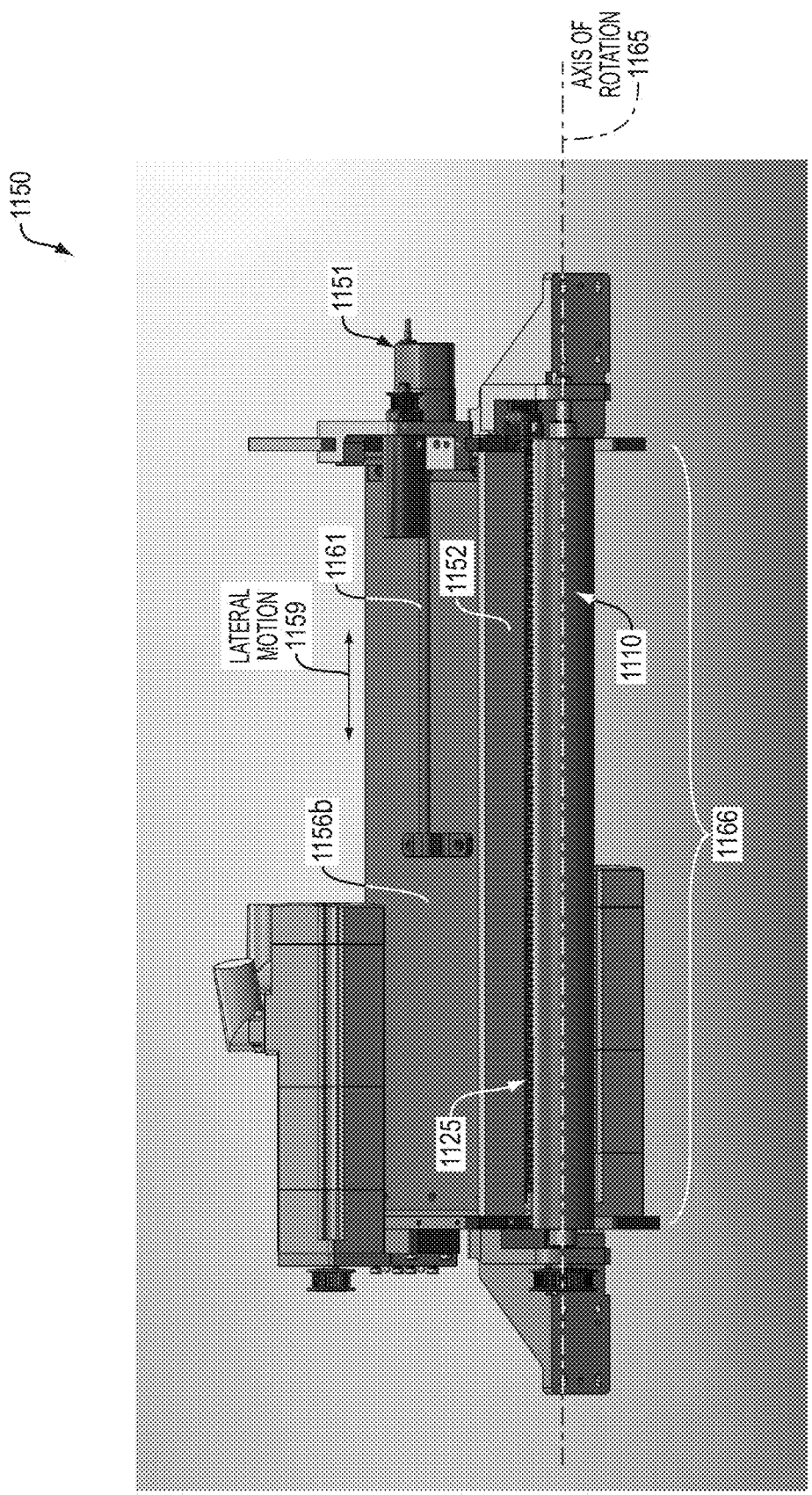
FIG. 11C is computer-aided design (CAD) drawing of a lateral view of the example embodiment of the metering apparatus of FIG. 11A.

FIG. 11C is computer-aided design (CAD) drawing of a lateral view of the example embodiment of the metering apparatus 1150 of FIG. 11A. As illustrated in FIG. 11C, the tool 1125 is a brush that spans at least a portion of the metering roller 1110. However, as disclosed above, the tool 1125 may be any suitable tool that forces the powder material off of the surface of the metering roller 1110. The given wall 1156b, that is, the metering wall, is coupled to a vibratory actuator 1151 that is configured to vibrate the given wall 1156b. The vibratory actuator 1151 may be any suitable vibratory actuator, as disclosed above, and is coupled to a mechanical component 1161 that is mounted to the given wall 1156b to cause lateral motion 1159 of the given wall 1156b via the mechanical component 1161. The lateral motion 1159 may be a back and forth motion of the given wall 1156b between a pair of opposite facing walls of the hopper that are positioned, respectively, at each end of the given wall 1156b, such as the opposite facing walls 1156c and 1156d illustrated in FIG. 11G, disclosed further below. The lateral motion 1159 may be in a direction that is substantially parallel to an axis of rotation 1165 of the metering roller 1110. The axis of rotation 1165 may be referred to interchangeably herein as a longitudinal axis. According to an example embodiment, motion of the given wall 1156b may be configured such that the motion is substantially the lateral motion 1159, enabling the gap 1116 to be maintained with a fixed distance between the given wall 1156b and the metering roller 1110 along a length 1166 of the metering roller 1110.

Figure 11D:
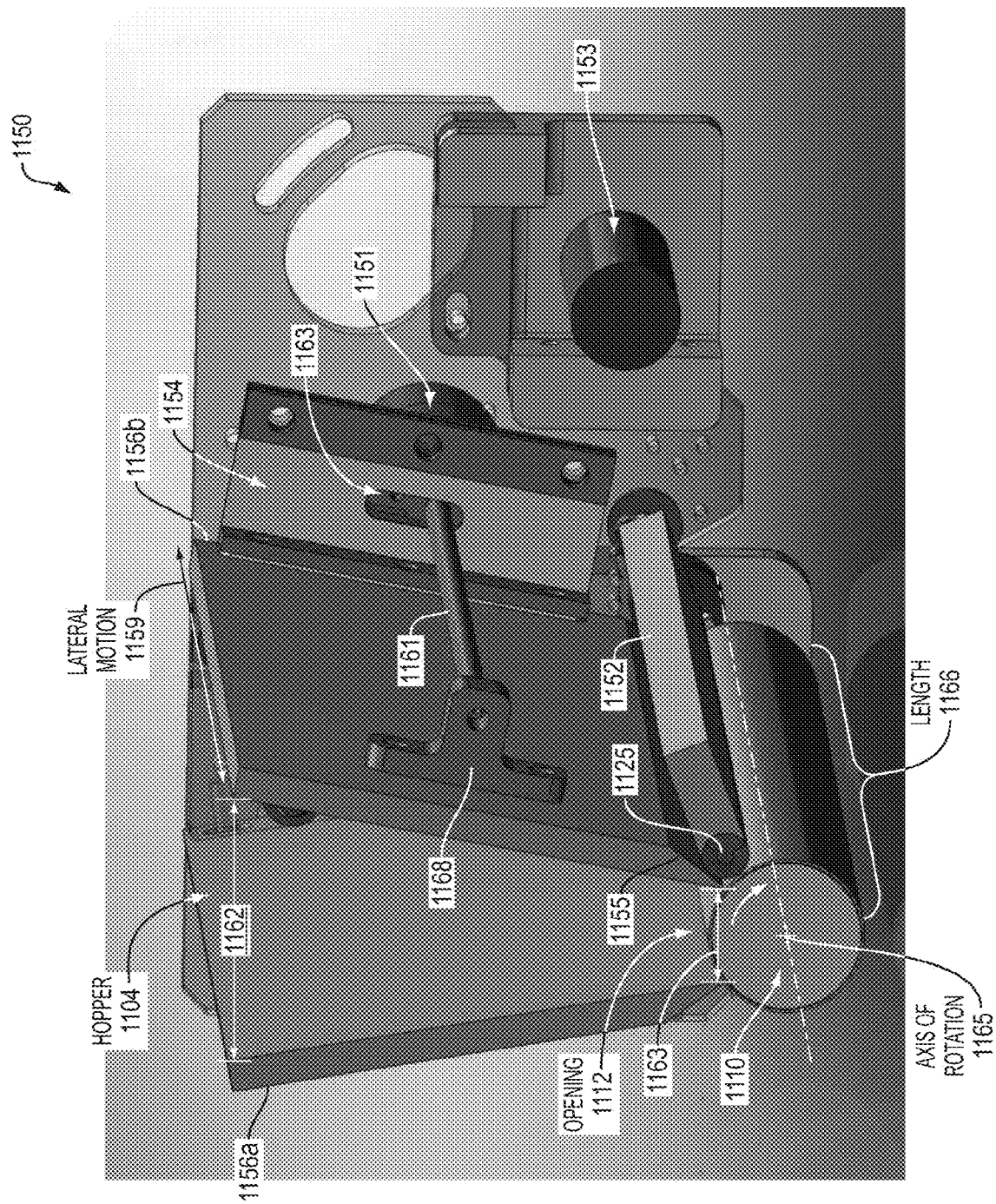
FIG. 11D is a CAD drawing of an isometric cut plot view of another example embodiment of the metering apparatus of FIG. 11A.

FIG. 11D is a CAD drawing of an isometric cut plot view of another example embodiment of the metering apparatus 1150 of FIG. 11A. The metering apparatus 1150 further comprises a motor 1153 configured to cause motion of the tool 1125. In the example embodiment of FIG. 11D, the tool 1125 is a brush and motion of the brush is rotation. However, as disclosed above, the tool 1125 may be any suitable tool and such motion may be any suitable motion. The metering apparatus 1150 further comprises a support rail 1152 that spans at least a portion of a length 1166 of the tool 1125. The support rail 1152 is configured to support the tool 1125 in the arrangement with the metering roller 1110. The motor 1153 may be a separate motor that is configured to cause the rotation of the brush, which may be a spiral brush. As such, in the example embodiment in which the tool 1125 is a spiral brush configured to rotate, the brush may be referred to interchangeably herein as a rotating spiral brush.

In the example embodiment of FIG. 11D, the walls 1156a and 1156b are nonparallel walls. The nonparallel walls 1156a and 1156b may be configured to be nonparallel, for example, by configuring the hopper walls at an angle that may be any suitable angle with respect to a center line, such as five, ten, or twenty degrees off of the center line. Alternatively, as disclosed above, the walls 1156a and 1156b may be parallel walls that are vertical. In the example embodiment of FIG. 11D, a first distance 1162 between the nonparallel walls at an entrance to the hopper 1104 for the powder material may be wider relative to a second distance 1163 between the nonparallel walls at the opening 1112, the opening 1112 being an exit from the hopper 1104 for the powder material.

The metering apparatus 1154 may further comprise a lateral motion support 1154 that is coupled to the given wall 1156b for support and configured to flex during operation of the vibratory actuator 1151 in response to vibration of the given wall 1156b. The vibratory actuator 1151 may be coupled to a mechanical component 1161 mounted to the given wall 1156b to cause the lateral motion 1159 of the given wall 1156b. The lateral motion support 1154 may be further configured to restrict motion of the given wall 1156b, substantially, to the lateral motion 1159.

For example, the given wall 1156b may be a rigid body that may move with multiple degrees of motion in an x-y-z direction. The lateral motion support 1154 may restrict such motion, eliminating degrees of motion that are not in a direction of the lateral motion 1156. As such, the lateral motion support 1154 may be further configured to restrict motion of the given wall 1156b, substantially, to the lateral motion 1159. The lateral motion support 1154 may be substantially thin so as to flex during operation of the vibratory actuator 1151, in response to vibration of the given wall 1156b.

In the example embodiment of FIG. 11D, the vibratory actuator 1151 and a mount 1168 to the given wall 1156b that holds the mechanical component 1161 are located on opposite sides of the lateral motion support 1154. As such, in the example embodiment of FIG. 11D, the mechanical component 1161 is configured to pass through an opening 1163 of the lateral motion support 1154. Alternatively, the vibratory actuator 1151 and the mount 1168 may be located on a same side of the lateral motion support 1154 and, thus, the mechanical component 1161 need not pass through the lateral motion support 1154.

In the example embodiment of FIG. 11D, the given wall 1156b includes a chamfer 1155 configured to enable the tool 1125 to reach the powder material as the powder material emerges from the opening 1112 of the hopper at the given wall 1156 due to the rotation of the metering roller 1110.

Figure 11E:
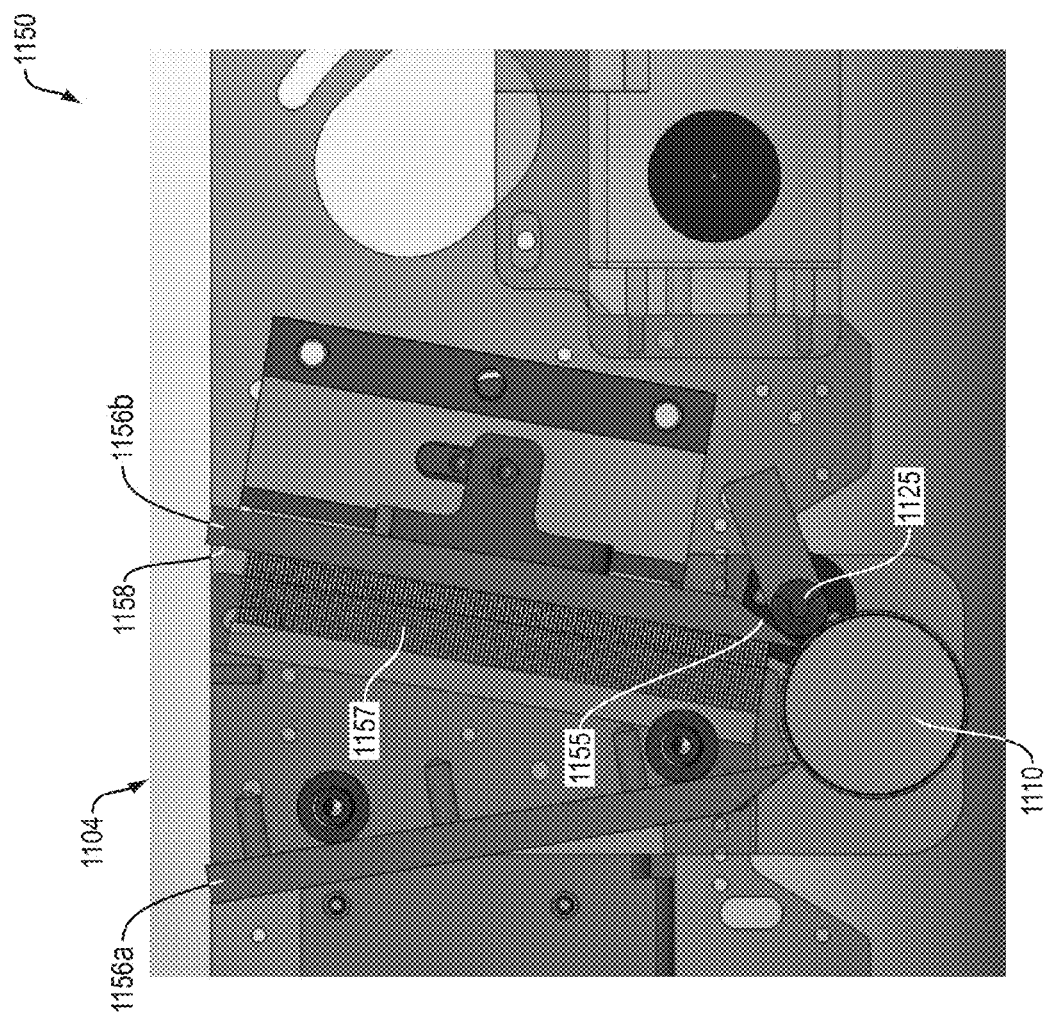
FIG. 11E is a CAD drawing of a cross-sectional view of another example embodiment of the metering apparatus of FIG. 11A.

FIG. 11E is a CAD drawing of a cross-sectional view of another example embodiment of the metering apparatus 1150 of FIG. 11A. The metering apparatus 1150 may further comprise at least two seals located at opposite ends of the given wall 1156b. The at least two seals may be coupled to an interior surface 1158 of the given wall 1156b and may be arranged to prevent the powder material from leaking out of the hopper 1104 due to lateral motion of the given wall 1156b, such as the lateral motion 1159 illustrated in FIG. 11D, disclosed above.

In the CAD drawing of the example embodiment of FIG. 11E, a first seal 1157 of the at least two seals is located at a first end of the given wall 1156b, such as the first end 1169 illustrated in FIG. 11G, disclosed further below. It should be understood that a second seal (not shown) of the at least two seals is located at the second end (not shown) of the given wall 1156b, such as the second end 1171 illustrated in FIG. 11G, disclosed further below.

In the example embodiment of FIG. 11E, the first seal 1157 is a brush. However, it should be understood that the first seal 1157 may formed by any suitable seal, such a felt material, a flexible rubber vane, or any other suitable seal that prevents the powder material from leaking out of the hopper 1104 due to lateral motion of the given wall 1156b.

Figure 11F:
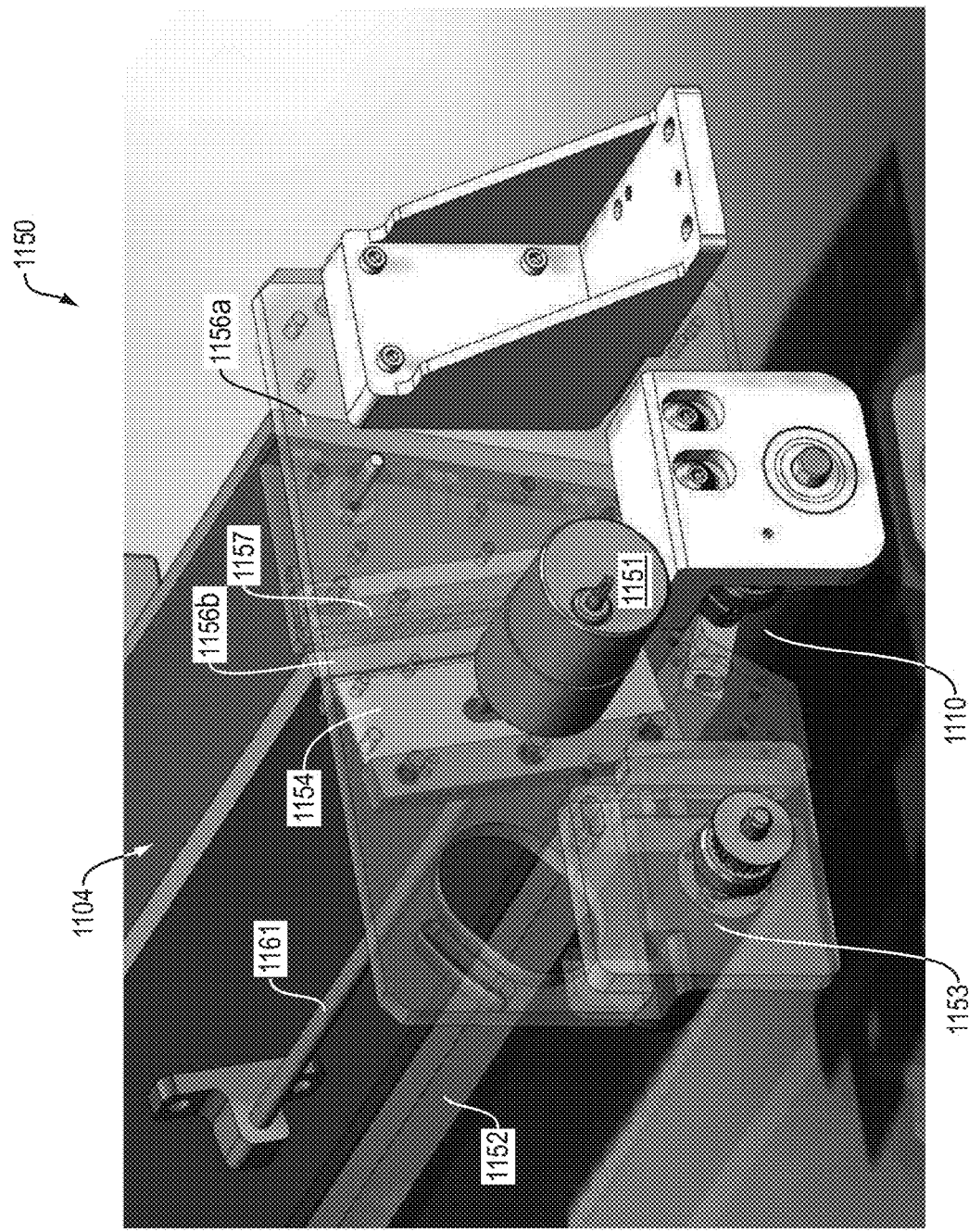
FIG. 11F is a CAD drawing of a cross-sectional view of another example embodiment of the metering apparatus of FIG. 11A.

FIG. 11F is a CAD drawing of a cross-sectional view of another example embodiment of the metering apparatus 1150 of FIG. 11A. The metering apparatus 1150 includes the hopper 1104, metering roller 1110, and tool (not shown) that is supported by the support rail 1152. The motor 1153 is configured to cause movement of the tool (not shown). The metering roller 1110 is located beneath an opening of the hopper 1104. The hopper 1104 has nonparallel walls 1156a and 1156b that are configured to contain powder material. The given wall 1156b is configured to vibrate. Such vibration may be caused by activating the vibratory actuator 1151 that is coupled to the mechanical component 1161 that is coupled to the given wall 1156b.

The metering apparatus 1150 further comprises the lateral motion support 1154 that may be a substantially thin sheet that allows for flexure while providing support to the given wall 1156b, as disclosed above. The metering apparatus further comprises the seal 1157 that is coupled to an interior surface of the given wall 1156b. In the example embodiment, the seal 1157 is a fixed brush that is arranged to provide a seal that prevents the powder material from leaking out of the hopper due to vibration of the given wall 1156b. As disclosed above, the seal 1157 may be any suitable seal.

Figure 11G:
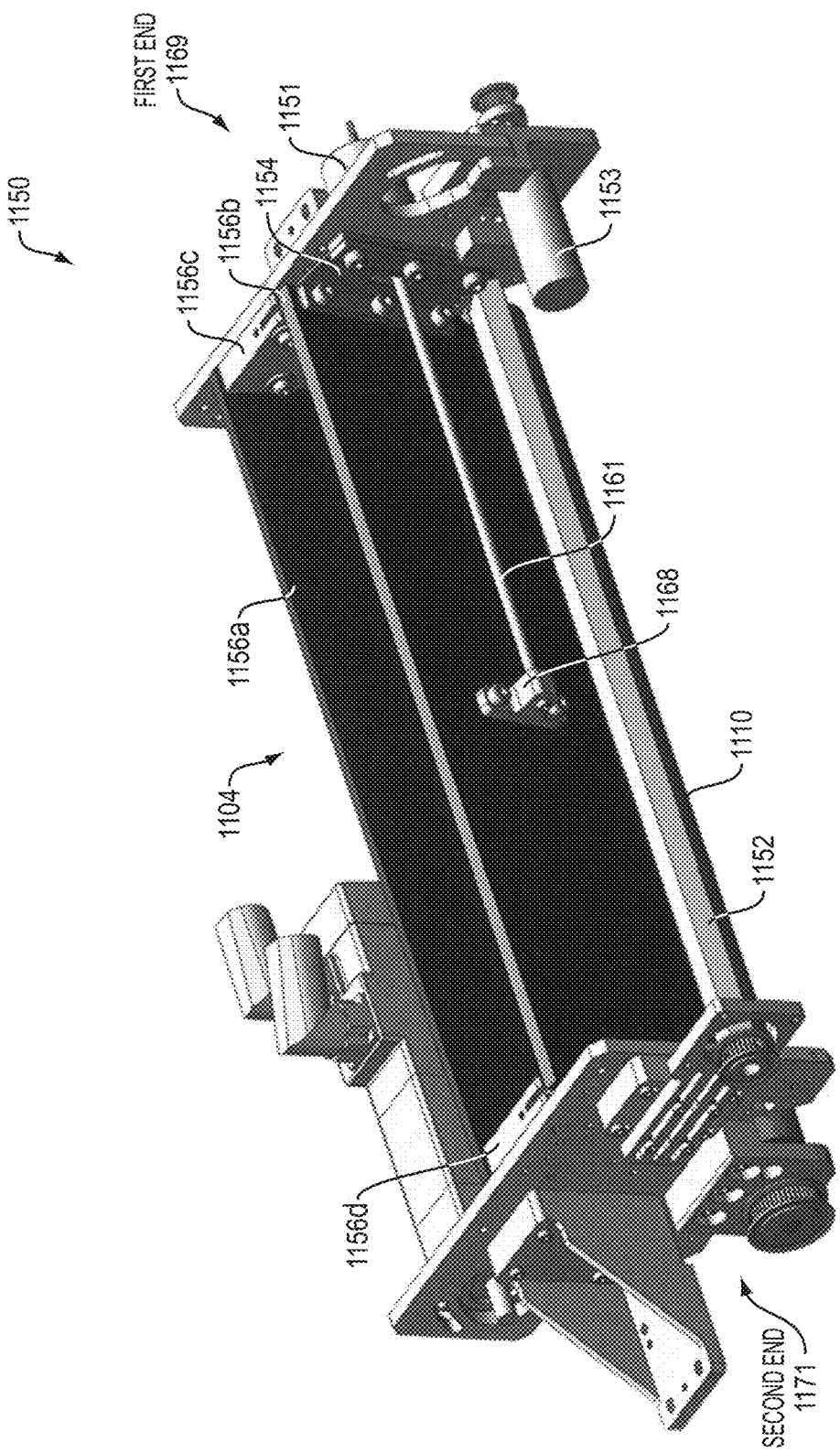
FIG. 11G is a CAD drawing of an example embodiment of the metering apparatus of FIG. 11A.

FIG. 11G is a CAD drawing of an example embodiment of the metering apparatus of FIG. 11A with elements, as disclosed above with reference to FIGS. 11A-E.

Figure 11H:
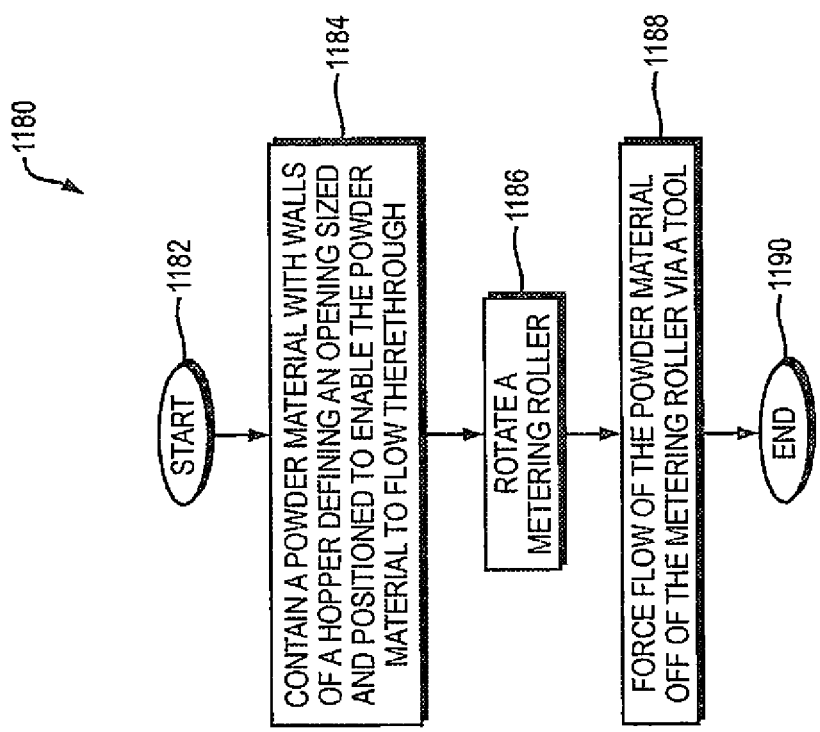
FIG. 11H is a flow diagram of a method for metering a powder material in a three-dimensional (3D) printing system.

FIG. 11H is a flow diagram of a method for metering a powder material in a three-dimensional (3D) printing system (1180). The method begins (1182) and contains a powder material with walls of a hopper defining an opening sized and positioned to enable the powder material to flow therethrough (1184). The method rotates a metering roller with located beneath the opening of the hopper, the metering roller and a given wall of the walls of the hopper spaced apart by a gap therebetween at the opening, the gap in combination with the rotating of the metering roller causing a flow of the powder material to flow from under the given wall of the hopper at a substantially predictable rate (1186). The method forces flow of the powder material off of the metering roller via a tool at the substantially predictable rate to supply the 3D printing system with the powder material for printing a 3D object, the tool positioned at the given wall where the flow emerges due to the rotation (1188), and the method thereafter ends (1190), in the example embodiment.

Figure 11I:
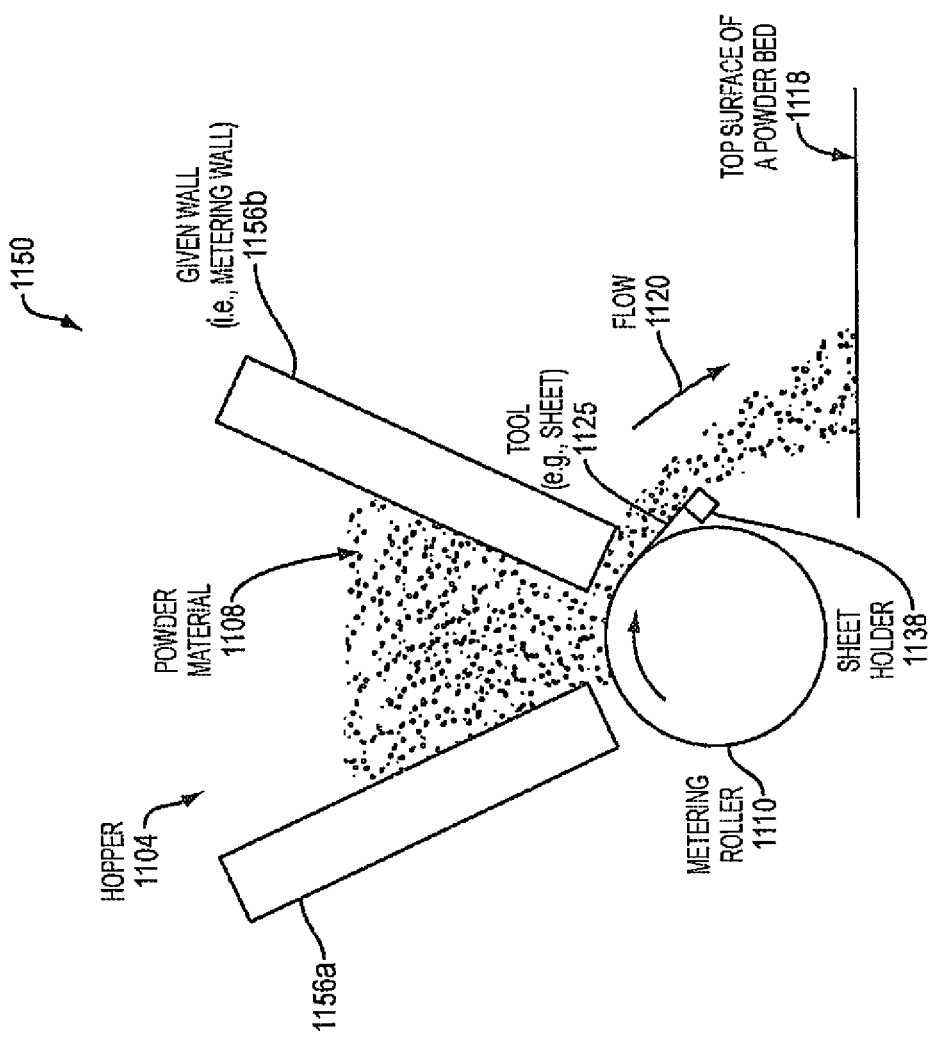
FIG. 11I is a block diagram of a cross-sectional view of an example embodiment of the metering apparatus of FIG. 11A in which the tool is a sheet.

FIG. 11I is a block diagram of a cross-sectional view of an example embodiment of the metering apparatus 1150 of FIG. 11A in which the tool 1125 is a sheet. According to the example embodiment of FIG. 11I, the tool 1125 is a sheet that may span at least a portion of a length of the metering roller 1110 and is arranged in contact with the metering roller 1110. The sheet may be a substantially thin sheet of metal or plastic that is configured to act as a knife to skive off the powder material 1108 from the metering roller 1110. According to an example embodiment, the substantially thin sheet may have a thickness ranging from 0.05-0.25 mm for metal and 0.1-0.5 mm for plastic.

The sheet may be configured to press gently against the metering roller 1110 via a sheet holder 1138. The sheet holder 1138 may be any suitable mechanism that supports the sheet in manner such that at least a portion of the sheet presses gently against the metering roller 1110 and the at least a portion is substantially tangential to the metering roller 1110. The sheet holder 1138 may be configured such that the sheet bends slightly and is substantially tangential to the metering roller 1110 and in contact with the metering roller 1110. According to an example embodiment, the sheet holder 1138 may be a bar, such as a stainless steel bar or any other suitable bar. However, the sheet holder 1138 may be any suitable holder that enables at least a portion of the sheet to be in contact with the roller 1110 and substantially tangential to the metering roller 1110. The at least a portion of the sheet may be an area of the sheet defined by a length of the sheet and at least a portion of a width of the sheet. The length of the sheet may be the same as a length of the metering roller 1110, such as the length 1166 of the metering roller 1110 of FIG. 11D, disclosed above. Alternatively, the length of the sheet may be different from the length of the metering roller 1110. The sheet may be a bendable sheet and a bend of the sheet may be controlled via positioning of the sheet holder 1138.

A position of the sheet holder 1138 may be adjustable, for example, by rotating the sheet holder 1138. For example, the sheet holder 1138 may be configured to rotate via threaded end. However, the position of the sheet holder 1138 may be controlled and adjusted in any suitable way.

The sheet may be configured to vibrate or reciprocate to aid in forcing the powder material 1108 to flow down onto the top surface 1118 of the powder bed. Such motion of the sheet may be controlled via a same or different actuator from that employed to control motion of the given wall. Further, a frequency of motion of the sheet relative to that of the given wall may be a same or different frequency.

Figure 11J:
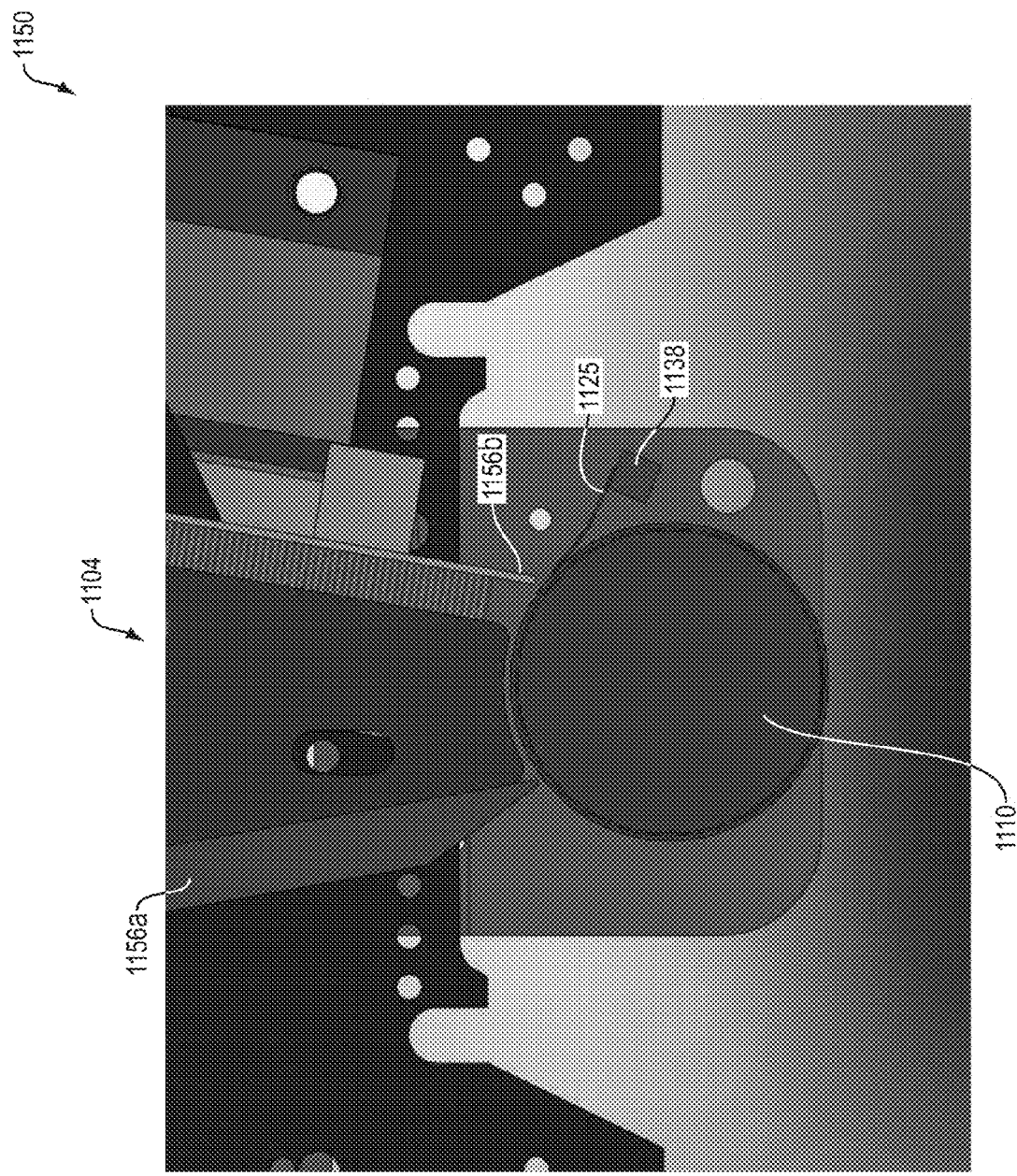
FIG. 11J is a CAD drawing of a cross-sectional view of an example embodiment of the metering apparatus 1150 of FIG. 11I, disclosed above, in which the sheet 1125 is bent by pressing against the metering roller 1110.

FIG. 11J is a CAD drawing of a cross-sectional view of an example embodiment of the metering apparatus 1150 of FIG. 11I, disclosed above, in which the sheet 1125 is bent by pressing against the metering roller 1110.

Figure 11K:
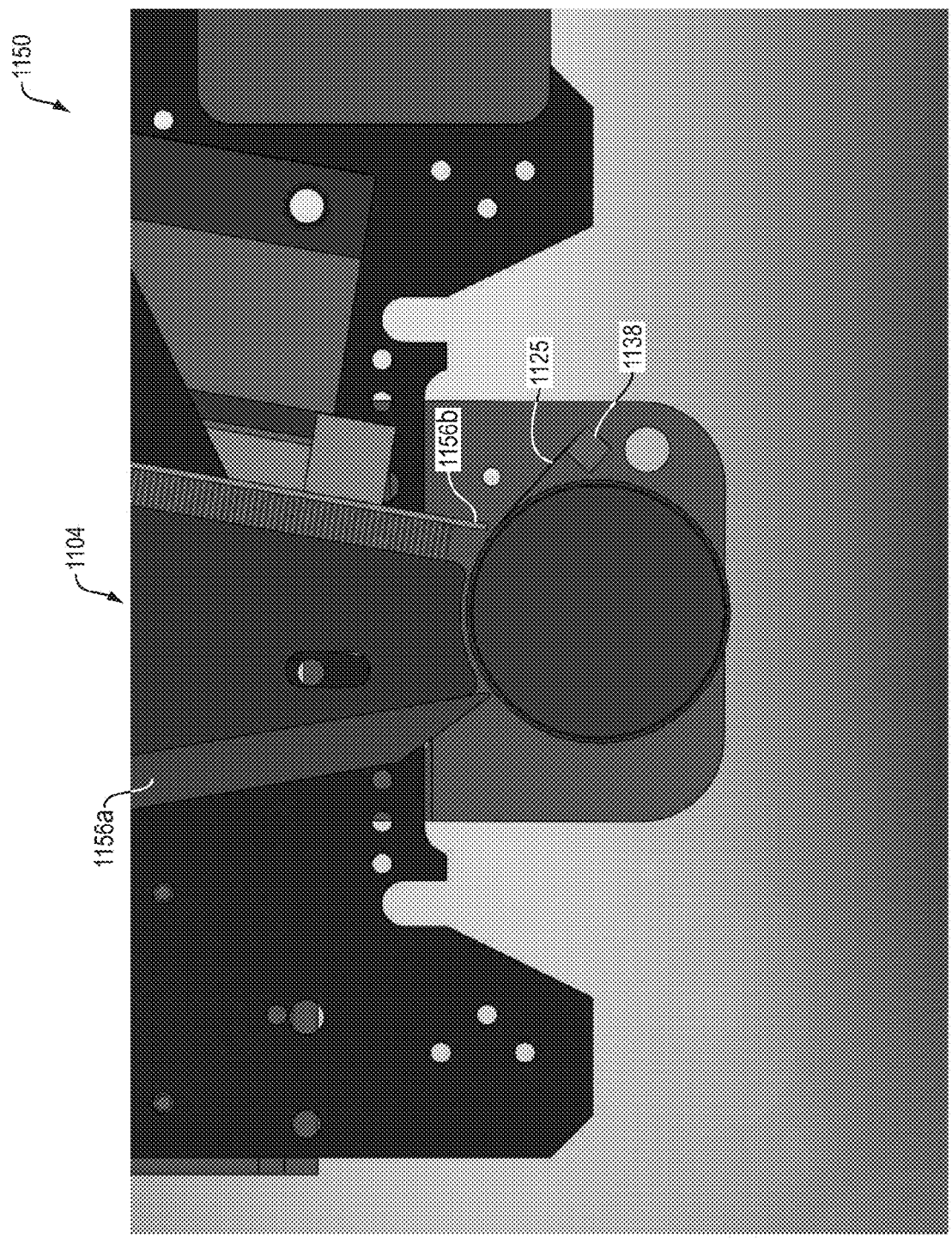
FIG. 11K is a CAD drawing of a cross-sectional view of another example embodiment of the metering apparatus of FIG. 11I in which the sheet is not bent.

FIG. 11K is a CAD drawing of a cross-sectional view of another example embodiment of the metering apparatus of FIG. 11I in which the sheet 1125 is not bent.

Figure 11M:
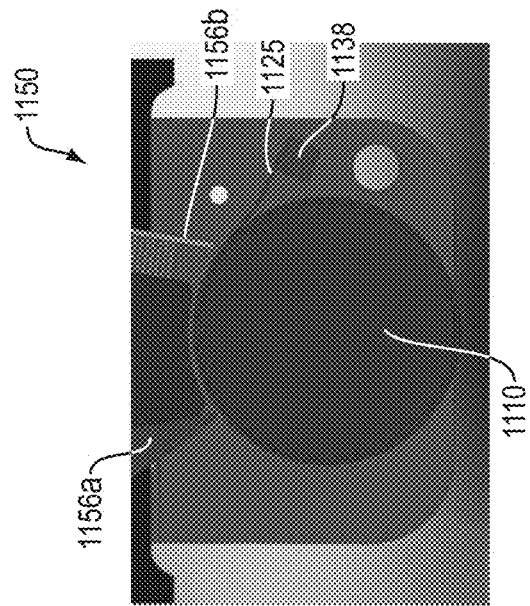
FIG. 11M is a CAD drawing of a close-up view of the example embodiment of FIG. 11J in which the sheet is bent.
Figure 11L:
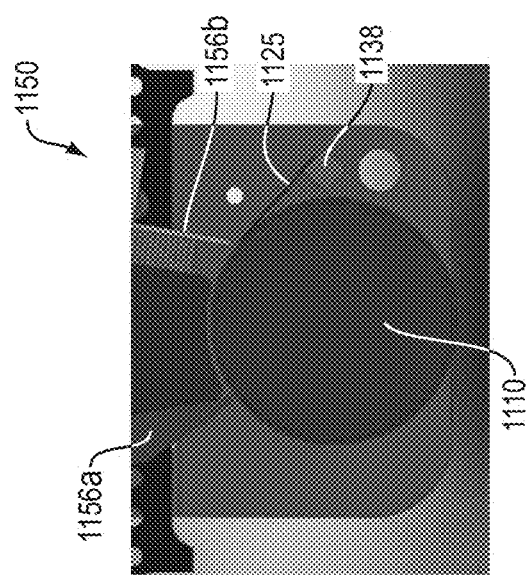
FIG. 11L is a CAD drawing of a close-up view of the example embodiment of FIG. 11K in which the sheet is not bent.

FIG. 11L is a CAD drawing of a close-up view of the example embodiment of FIG. 11K in which the sheet 1125 is not bent.

FIG. 11M is a CAD drawing of a close-up view of the example embodiment of FIG. 11J in which the sheet 1125 is bent.

Figure 11N:
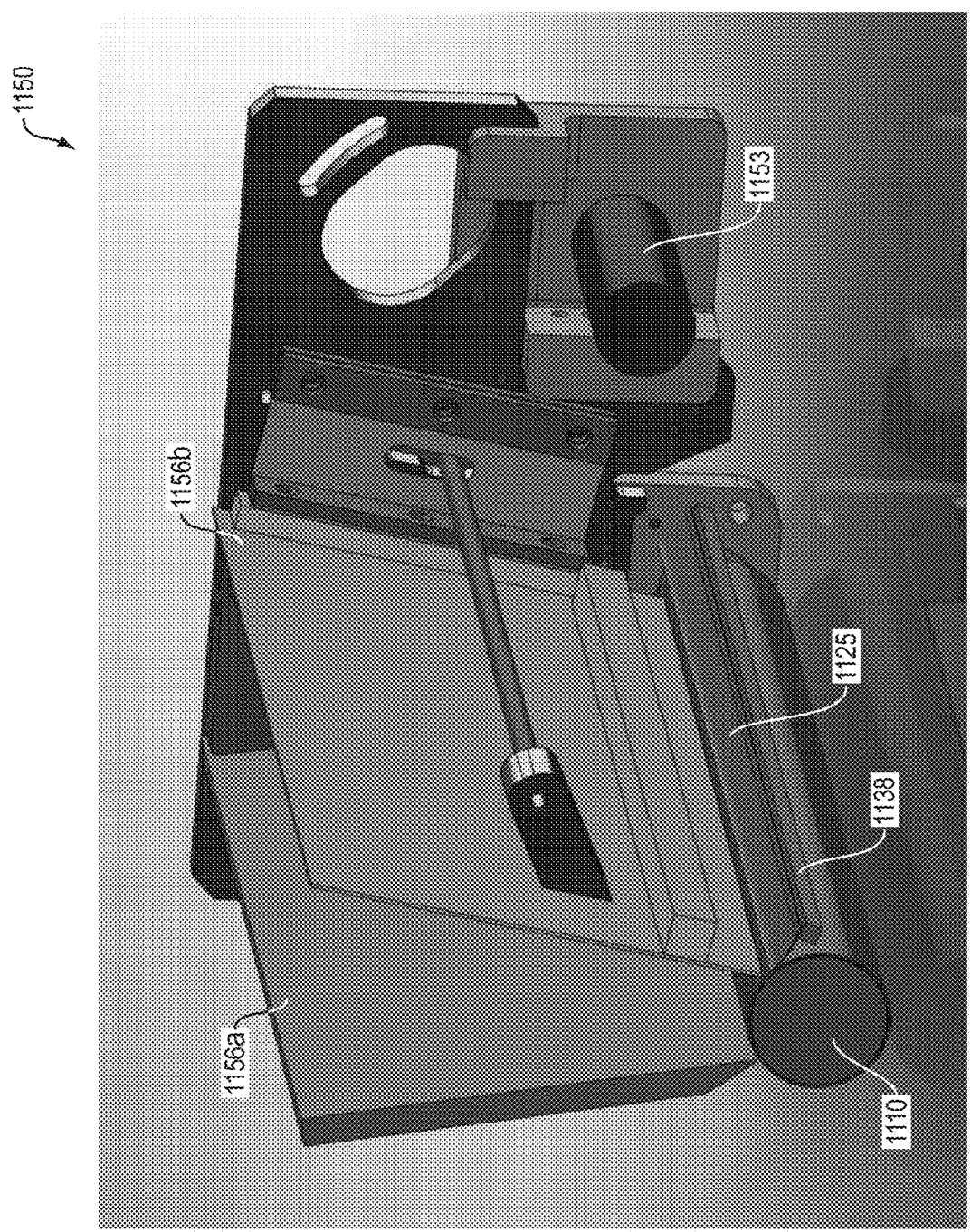
FIG. 11N is a CAD drawing of an isometric cut plot view of an example embodiment of the metering apparatus of FIG. 11J, in which the sheet is bent by pressing against the metering roller.

FIG. 11N is a CAD drawing of an isometric cut plot view of an example embodiment of the metering apparatus 1150 of FIG. 11J, disclosed above, in which the sheet 1125 is bent by pressing against the metering roller 1110.

Figure 11O:
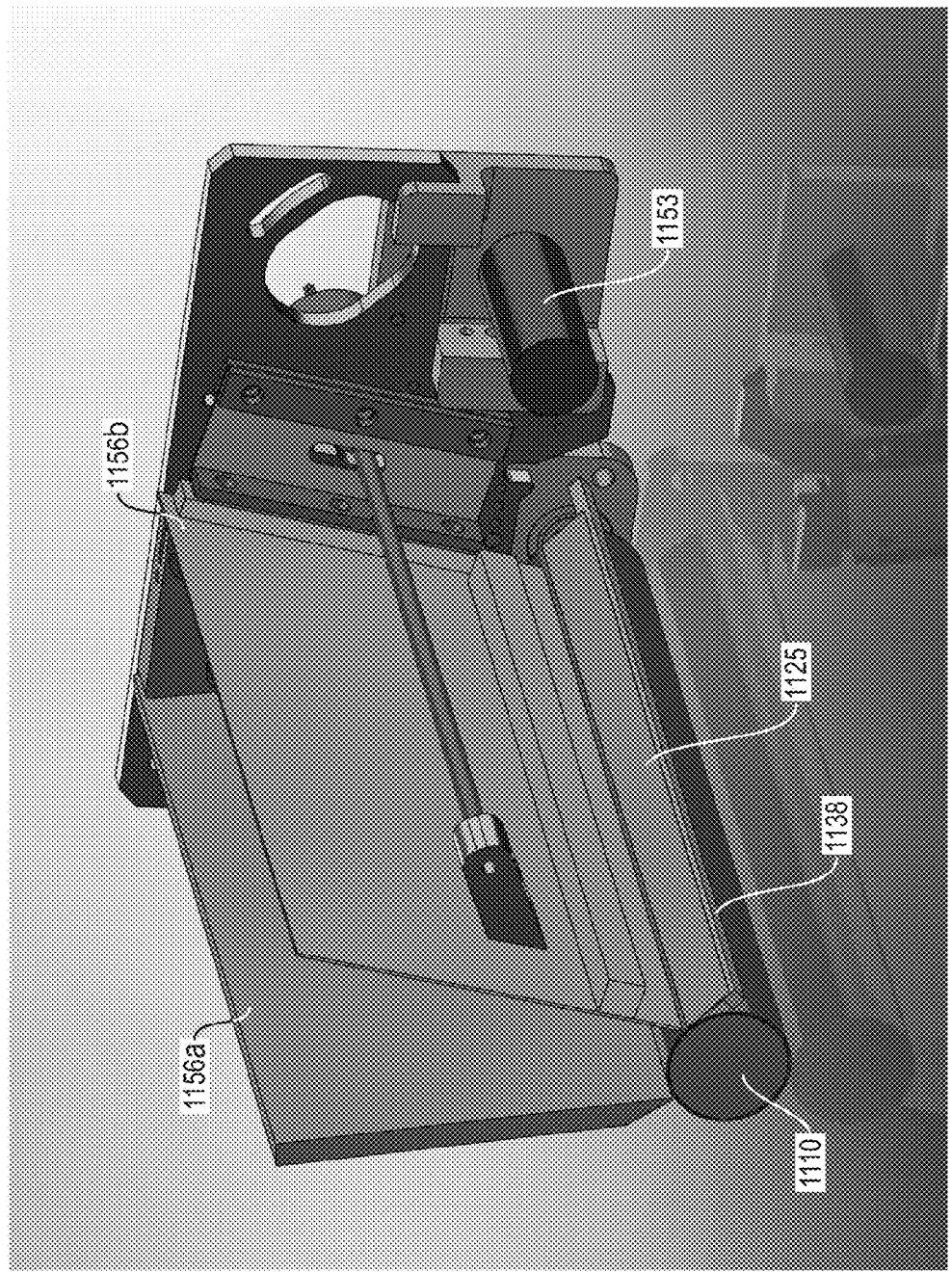
FIG. 11O is a CAD drawing of an isometric cut plot view of an example embodiment of the metering apparatus of FIG. 11K, in which the sheet is straight against the metering roller.

FIG. 11O is a CAD drawing of an isometric cut plot view of an example embodiment of the metering apparatus 1150 of FIG. 11K, disclosed above, in which the sheet 1125 is straight against the metering roller 1110.

Figure 11P:
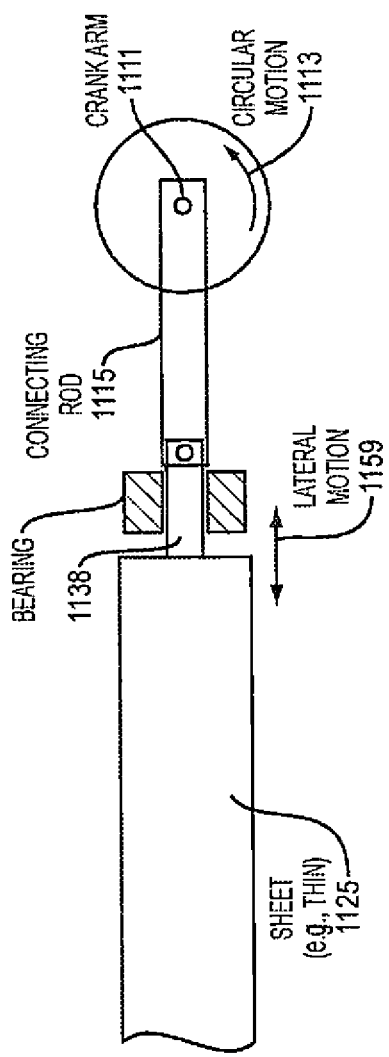
FIG. 11P is block diagram of an example embodiment of a crank arm that may be used to cause lateral motion of the tool 1125 of FIG. 11A.

FIG. 11P is block diagram of an example embodiment of a crank arm 1111 that may be used to cause lateral motion 1159 of the tool 1125 of FIG. 11A, disclosed above. In the example embodiment, the tool 1125 is a sheet, as disclosed above. The crank arm 1111 may be coupled to a motor (not shown) or other suitable actuator that causes the crank arm 1111 to engage in a circular motion 1113 that may be translated into linear motion of a connecting rod 1115 coupled to the crank arm 1111 and the sheet holder 1138, resulting in the lateral motion 1159 of the tool 1125, that is, the sheet in the example embodiment. The lateral motion 1159 may be in a direction that is substantially parallel to an axis of rotation 1165 of the metering roller 1110, as disclosed above with reference to FIG. 11C.

Figure 11Q:
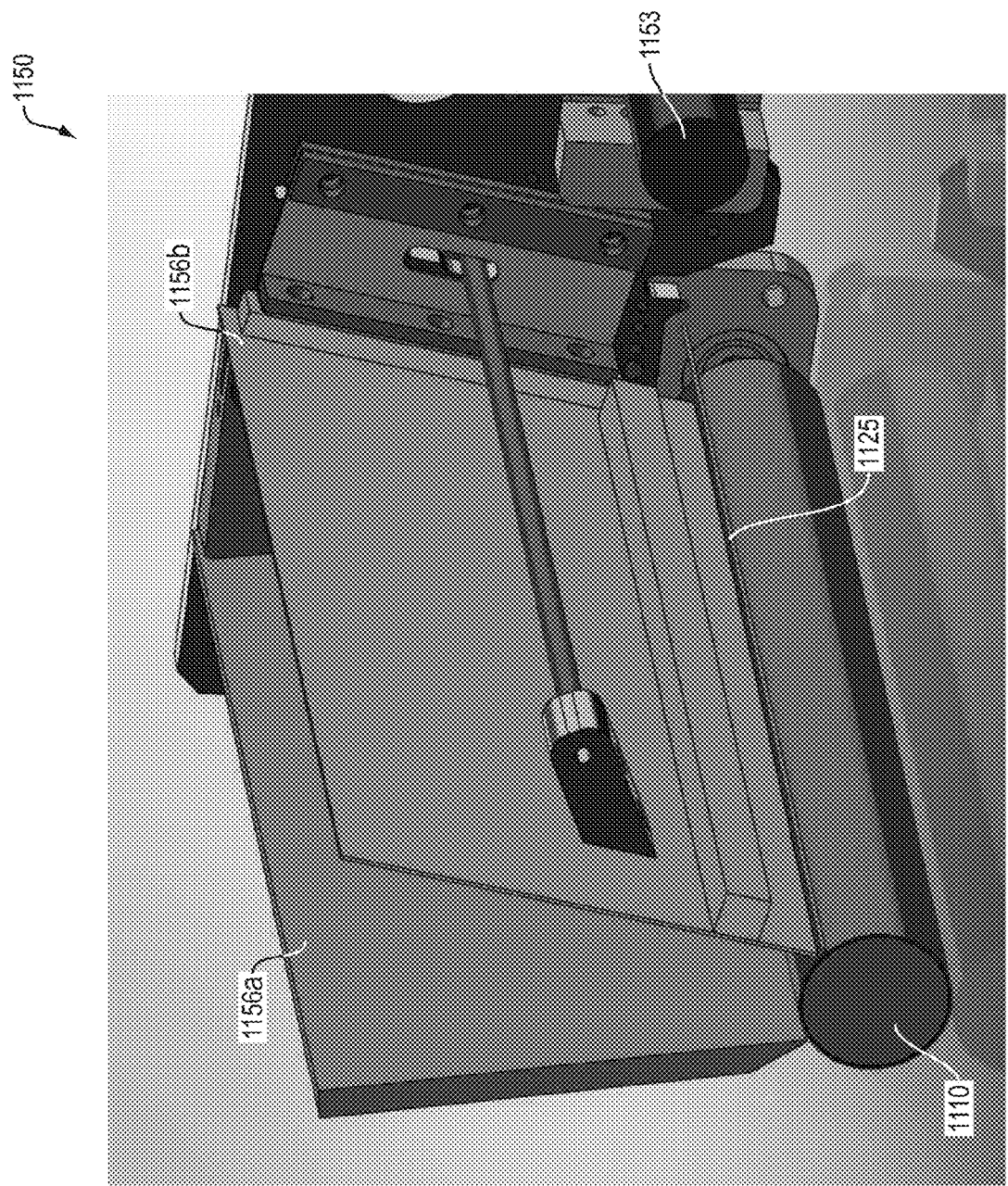
FIG. 11Q is a CAD drawing of an isometric cut plot view of an example embodiment of the metering apparatus of FIG. 11A, in which the tool 1125 is a wire.

FIG. 11Q is a CAD drawing of an isometric cut plot view of an example embodiment of the metering apparatus 1150 of FIG. 11A, disclosed above, in which the tool 1125 is a wire. According to an example embodiment, the tool 1125 may be a wire under high tension which rides against the metering roller 1110. For example, a high strength steel wire of diameter between 100 and 500 microns may be used. The wire may be of a hard stainless steel alloy, tool steel alloy or high-carbon steel alloy, such as those know in the art. The wire may be tensioned to between ¼ and ¾ of its breaking strength so as to maintain its straightness.

Figure 11R:
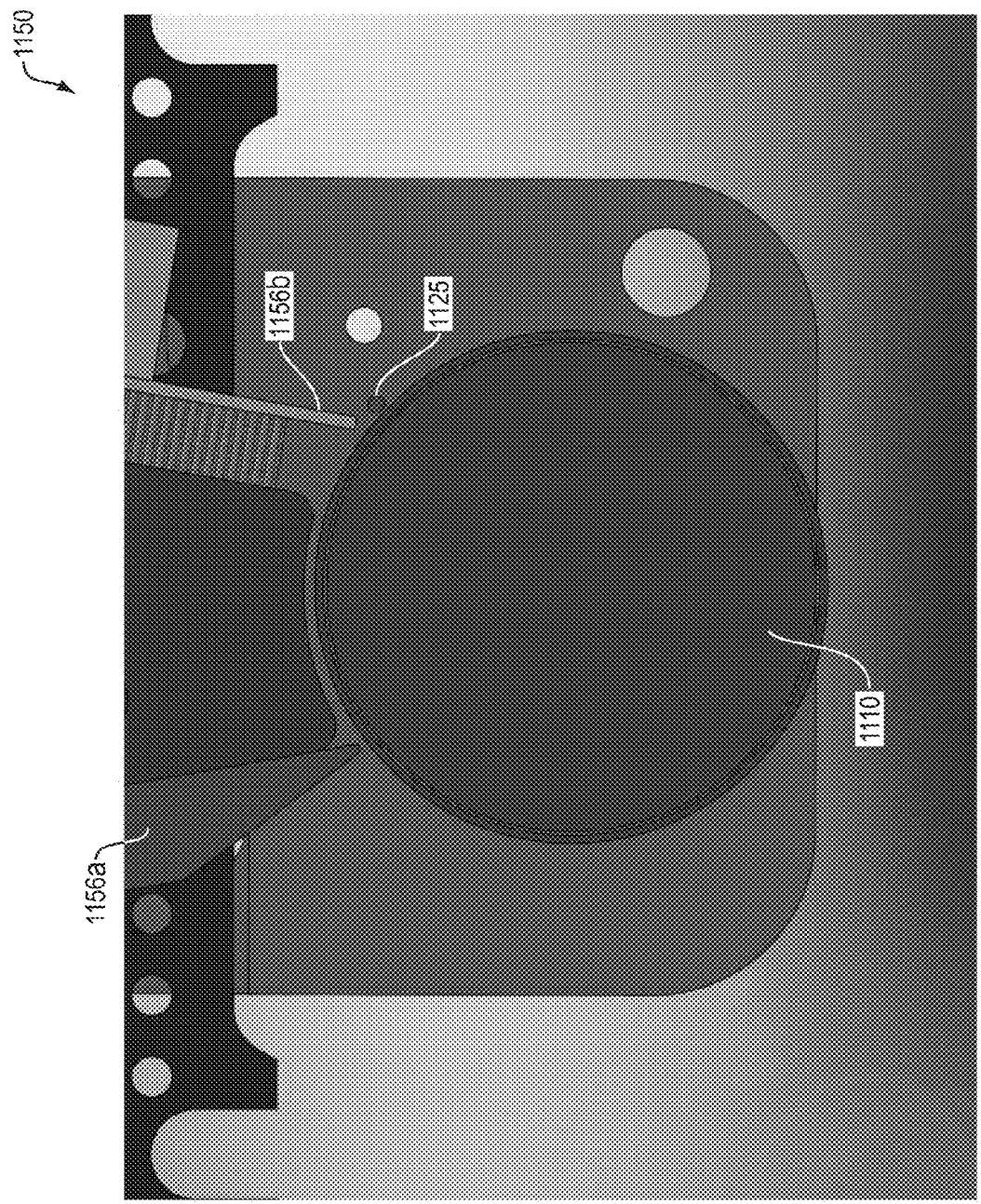
FIG. 11R is a CAD drawing of a close-up view of an example embodiment of the metering apparatus of FIG. 11A, in which the tool is a wire.

FIG. 11R is a CAD drawing of a close-up view of an example embodiment of the metering apparatus 1150 of FIG. 11A, disclosed above, in which the tool 1125 is a wire.

Figure 12:
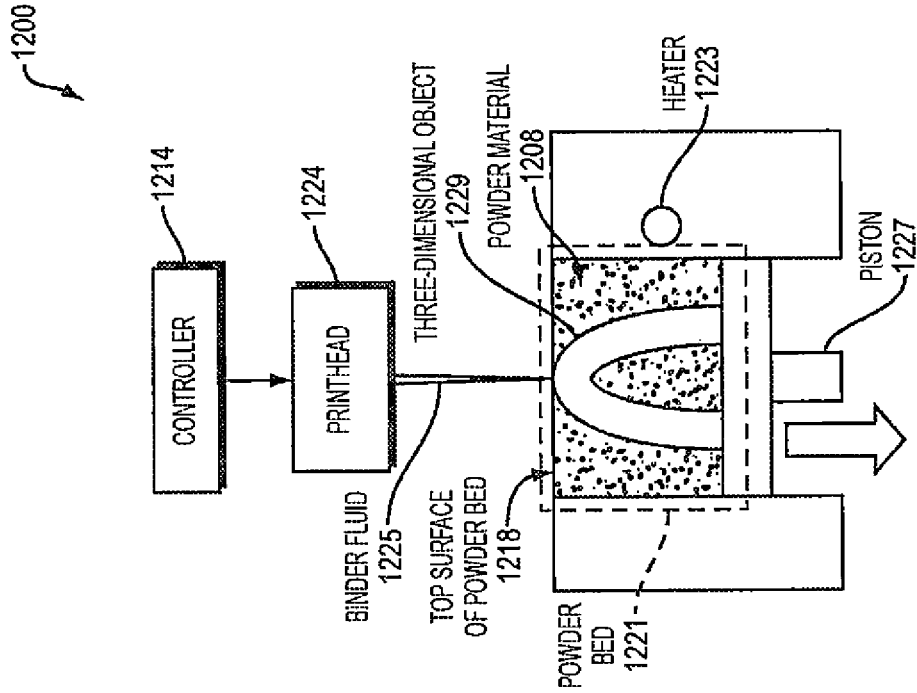
FIG. 12 is a block diagram of an example embodiment of a powder bed.

FIG. 12 is a block diagram 1200 of an example embodiment of a powder bed 1221. According to an example embodiment, the powder bed 1221 may be supported by a piston 1227 and surrounded by walls. The piston 1227 may be configured to move downward following application of the binder fluid 1225 by the printhead 1224 as controlled by the controller 1214. A heater 1223 may be configured to heat the powder bed 1221 to dry the binder fluid 1225 and to maintain flowability of the powder material 1208. The heater 1223 may be any suitable heater, such as a resistance heater embedded in one or more walls defining the powder bed 1221 or additionally, or alternatively, the heater 1223 may be an induction heater. The heater 1223 may be controlled (e.g., through electrical communication with the controller 1214) to heat the three-dimensional object 1229 in the powder bed 1221 to a target temperature. As disclosed above, operations may be repeated (e.g., with a controlled two-dimensional pattern for each respective layer) in sequence to form subsequent layers until, ultimately, the 3D object 1229 may be formed in the powder bed 1221.

Figure 13:
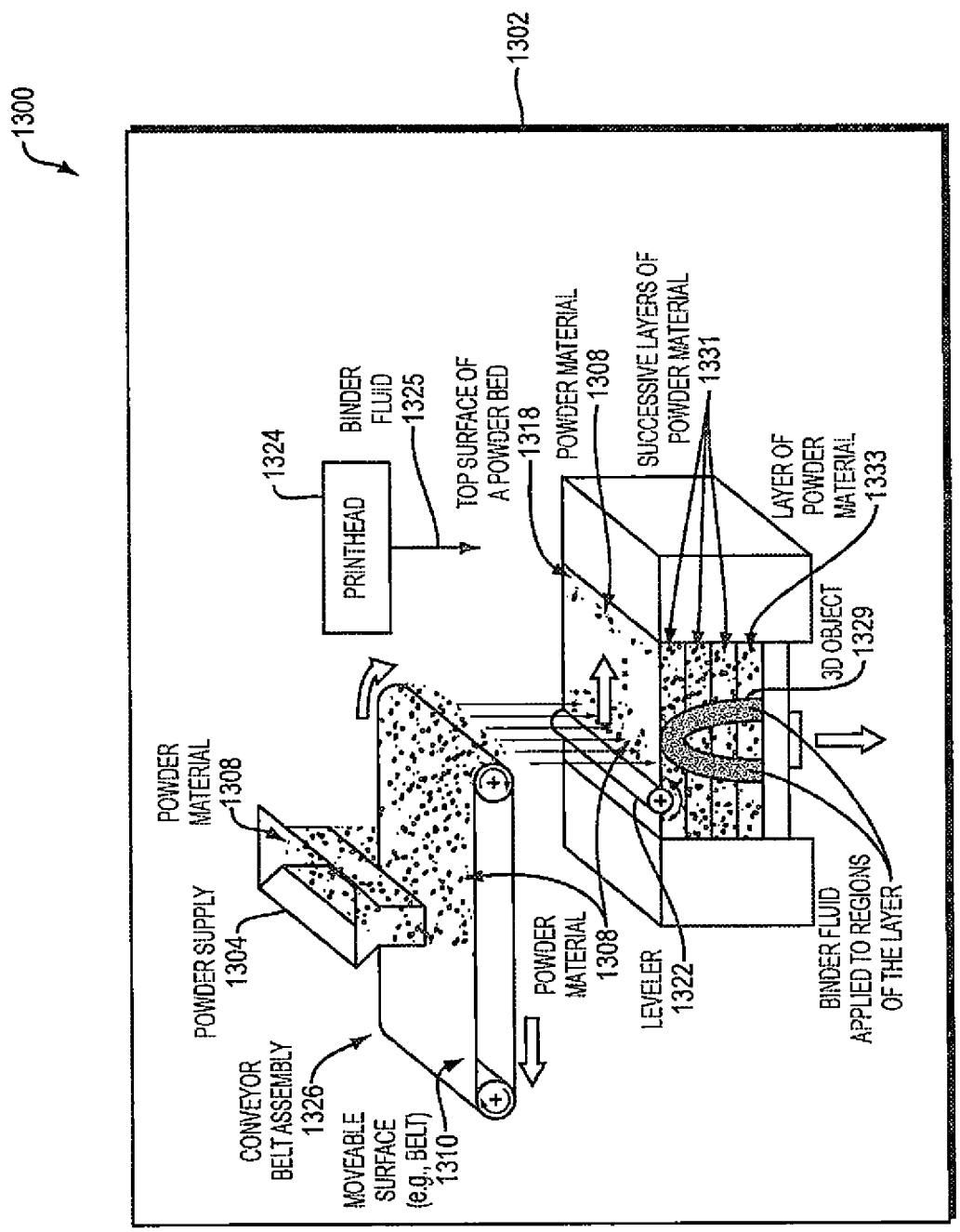
FIG. 13 is a block diagram of another example embodiment of a system for additive manufacturing of a 3D object.

FIG. 13 is a block diagram 1300 another example embodiment of a system 1302 for additive manufacturing of a 3D object 1329. The system 1302 comprises a powder supply 1304 configured to store a powder material 1308. The system 1302 comprises a moveable surface 1310 located beneath an opening of the powder supply 1304, and a controller (not shown) is configured to control a motion of the moveable surface 1310 relative to the powder supply 1304 to meter the powder material 1308 at the opening to produce a flow of the powder material 1308 away from the powder supply 1304 and onto the moveable surface 1310. The opening and the moveable surface 1310 are spaced apart by a gap therebetween. According to an example embodiment, the metering operation may be based on the gap and the motion of the moveable surface. Such motion may enable the powder material 1308 to flow from the powder supply 1304. Absent the motion, the powder material 1308 does not flow from the powder supply 1308.

The moveable surface 1310 may be configured to deposit the flow onto the top surface 1318 of a powder bed to produce a metered amount of the powder material 1308 on the top surface 1318 of the powder bed. The system 1302 comprises a leveler 1322 that is configured to level the metered amount across the top surface 1318 of the powder bed to form a layer of the powder material 1308. The system 1302 comprises a printhead 1324. The printhead 1324 is configured to apply a binder fluid 1325 to at least one region of the layer 1333. The binder fluid 1325 may be configured to cause the layer to become bonded at the at least one region to form a bonded layer of the 3D object 1329. The metered amount may be deposited in front of the leveler 1322 in a form of a pile in front of the leveler 1322 or distributed along the powder bed in front of the leveler 1322. According to an example embodiment, metering and leveling of a given layer may be activated concurrently. Alternatively, metering of the powder material 1108 may be such that a metered amount for an entire given layer is deposited prior to activation of the leveler to level the given layer.

A controller (not shown) may be configured to control motion of the leveler 1322, release of the binder fluid 1325 from the printhead 1324, and a vertical movement of the top surface 1318 of the powder bed. The controller may be further configured to actuate the printhead 1324 to deliver the binder fluid 1325 from the printhead 1324 to each layer of the powder in a controlled two-dimensional pattern as the printhead 1324 moves across the top surface 1318 of the powder bed.

According to an example embodiment, (i) the bonded layer may become the top surface 1318 of the powder bed and the powder bed may be configured to move downward in a vertical direction to enable formation of a successive layer 1331 of the powder material 1308. According to the example embodiment, (ii) the moveable surface 1310 may be further configured to deposit the flow onto the bonded layer to produce a metered amount of the powder material on the bonded layer. According to the example embodiment, (iii) the leveler 1322 may be further configured to level the metered amount across the bonded layer to form a successive layer of the powder material 1308. According to the example embodiment, (iv) the printhead 1324 may be further configured to apply the binder fluid 1325 to at least one respective region of the successive layer to cause the successive layer 1331 to become bonded at the least one respective region and to each layer adjacent thereto. According to the example embodiment, the system may be configured to repeat (i) through (iv) in accordance with a definition for the 3D object 1329.

Figure 14:
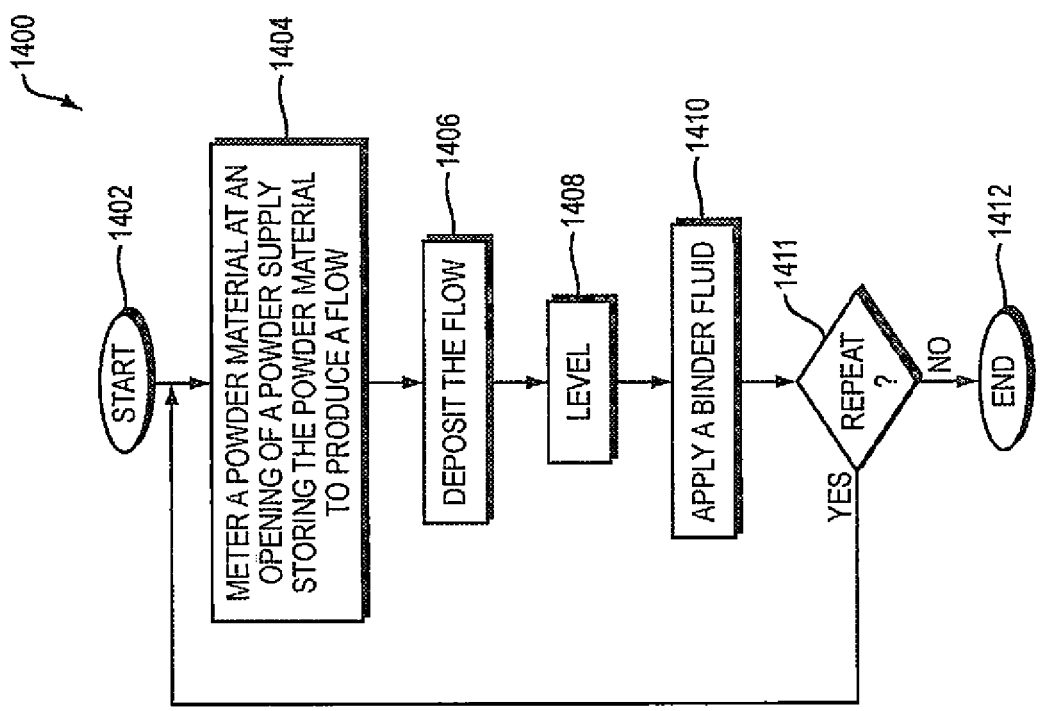
FIG. 14 is a flow diagram of an example embodiment of a method for additive manufacturing of a 3D object.

FIG. 14 is a flow diagram 1400 of an example embodiment of a method for additive manufacturing of a three-dimensional (3D) object. The method may begin (1402) and may meter a powder material at an opening of a powder supply storing the powder material to produce a flow of the powder material away from the powder supply and onto a moveable surface located beneath the opening (1404). The opening and the moveable surface may be spaced apart by a gap therebetween; the metering may be based on the gap and a motion of the moveable surface relative to the powder supply. The motion may enable the powder material to flow from the powder supply. The method may deposit the flow from the moveable surface onto a top surface of a powder bed to produce a metered amount of the powder material on the top surface of the powder bed (1406). The method may level the metered amount across the top surface of the powder bed to form a layer of the powder material (1408). The method may apply a binder fluid to at least one region of the layer, the binder fluid may cause the layer to become bonded at the at least one region to form a bonded layer of the 3D object (1410). The method may check for whether or not to continue repeat the process (1411). If yes, the method may continue and meter the powder material at the opening of the powder supply storing the powder material to produce the flow of the powder material away from the powder supply and onto the moveable surface located beneath the opening (1404). If not, the method thereafter ends (1412), in the example embodiment.

FIG. 15 is a block diagram of an example of the internal structure of a computer 1500 in which various embodiments of the present disclosure may be implemented. The computer 1500 contains a system bus 1502, where a bus is a set of hardware lines used for data transfer among the components of a computer or processing system. The system bus 1502 is essentially a shared conduit that connects different elements of a computer system (e.g., processor, disk storage, memory, input/output ports, network ports, etc.) that enables the transfer of information between the elements. Coupled to the system bus 1502 is an I/O device interface 1504 for connecting various input and output devices (e.g., keyboard, mouse, displays, printers, speakers, etc.) to the computer 1500. A network interface 1506 allows the computer 1500 to connect to various other devices attached to a network. Memory 1508 provides volatile storage for computer software instructions 1510 and data 1512 that may be used to implement embodiments of the present disclosure. Disk storage 1514 provides non-volatile storage for computer software instructions 1510 and data 1512 that may be used to implement embodiments of the present disclosure. A central processor unit 1518 is also coupled to the system bus 1502 and provides for the execution of computer instructions.

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry of FIG. 15, disclosed above, or equivalents thereof, firmware, a combination thereof, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein. Further, example embodiments and elements thereof may be combined in a manner not explicitly disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. An apparatus of a three-dimensional binder jet printer for metering flow of a metal powder, the apparatus comprising:
   a hopper having a plurality of walls defining a downstream opening;
   a roller disposed downstream of the plurality of walls and spaced apart from the opening of the hopper by a predetermined distance so as to form an unobstructed gap between the opening and the roller, wherein, when the hopper contains the metal powder, the predetermined distance between the opening of the hopper and the roller is such that rotation of the roller is configured to facilitate flow and metering of the metal powder out of the opening and underneath a first wall of the plurality of walls of the hopper to dispense a metered amount of the metal powder onto a powder bed and ceasing rotation of the roller is configured to inhibit flow of the metal powder out of the opening and underneath the first wall; and
   a leveler disposed between the rotatable device and the powder bed, the leveler being configured to move along a surface of the powder bed to follow the roller and to contact the dispensed metal powder.

2. The apparatus of claim 1, further comprising a tool spaced apart from the roller, wherein the tool is configured to span a length of the roller and to contact a surface of the roller.

3. The apparatus of claim 1, further comprising a tool spaced apart from the roller, wherein the tool is at least one of a sheet, a wire, a brush, a blade, an air knife, or a razor.

4. The apparatus of claim 1, wherein a surface of the roller is roughened.

5. The apparatus of claim 4, wherein the roughened surface includes one or more of a plurality of grooves, a plurality of knurl es, or an abrasive material.

6. The apparatus of claim 1, further comprising a tool spaced apart from the roller, wherein the tool is flexible.

7. The apparatus of claim 1, wherein the plurality of walls of the hopper further includes a second wall, and wherein the first wall is parallel to the second wall.

8. The apparatus of claim 1, wherein the plurality of walls of the hopper further includes a second wall, and wherein a first distance between the first wall and the second wall at an upstream end of the hopper is greater than a second distance between the first wall and the second wall at the opening of the hopper.

9. The apparatus of claim 1, further comprising a tool spaced apart from the roller and a motor, wherein the motor is configured to rotate the tool.

10. The apparatus of claim 1, wherein the first wall is coupled to an actuator configured to vibrate the first wall.

11. The apparatus of claim 10, wherein the actuator is coupled to a mechanical component mounted to the first wall and is configured to cause lateral motion of the first wall via the mechanical component.

12. The metering apparatus of claim 11, wherein the mechanical component is a push rod and the actuator is a linear voice coil.

13. The apparatus of claim 1, wherein the roller overlaps the first wall in a vertical direction.

14. An apparatus of a three-dimensional binder jet printer for metering flow of a metal powder, the apparatus comprising:
   a hopper including a plurality of walls defining an upstream opening, a downstream opening, and a flow path therebetween;

a roller positioned downstream of the downstream opening and spaced apart from the hopper so as to form a gap between the downstream opening and the roller, wherein, when the hopper contains the metal powder, a height of the gap is configured to facilitate flow and metering of the metal powder out of the downstream opening, underneath a first wall of the plurality of walls of the hopper, and directly onto the roller only when the roller is rotating; and a tool configured to engage the roller.

15. The apparatus of claim 14, further comprising a powder bed configured to receive the metal powder from the roller during printing of a three-dimensional object, wherein the hopper, the roller, and the tool are configured to move along a surface of the powder bed from a first side to a second side, opposite the first side, and back to the first side, and wherein the powder bed is configured to move vertically away from the apparatus after each successive movement of the hopper, the roller, and the tool from the first side to the second side and from the second side to the first side.

16. The apparatus of claim 15, further comprising a leveler disposed between the roller and the powder bed, the leveler being configured to move along the surface of the powder bed to follow the roller and to level dispensed metal powder.

17. The apparatus of claim 14, wherein the tool is at least one of a sheet, a wire, a brush, a blade, an air knife, or a razor.

18. The apparatus of claim 14, wherein a surface of the roller includes one or more of a plurality of grooves, a plurality of knurles, or an abrasive material.

19. The apparatus of claim 14, wherein the tool is flexible.

20. The apparatus of claim 14, wherein the plurality of walls of the hopper further includes a second wall, and wherein the first wall is parallel to the second wall.

21. The apparatus of claim 14, wherein the plurality of walls of the hopper further includes a second wall, wherein a first distance between the first wall and the second wall at an upstream end of the hopper is greater than a second distance between the first wall and the second wall at the downstream opening of the hopper.

22. The apparatus of claim 14, further comprising a motor, wherein the motor is configured to rotate the tool in a direction opposite a rotational direction of the roller.

23. The apparatus of claim 14, wherein the first wall is coupled to an actuator configured to vibrate the first wall.

24. The apparatus of claim 14, further comprising a leveler disposed between the roller and the powder bed, the leveler configured to move along a surface of the powder bed to level the metal powder received from the metering apparatus.

25. An apparatus of a three-dimensional binder jet printer for metering flow of a metal powder, the metering apparatus comprising:

a hopper having a plurality of walls and defining a downstream opening, wherein at least two of the plurality of walls are parallel to one another;

a roller positioned downstream of the downstream opening in a vertical direction and spaced apart from the hopper so as to define a gap between the downstream opening and the roller, wherein the downstream opening faces the roller, and wherein, when the hopper contains the metal powder, a height of the gap is such that rotation of the roller is configured to facilitate flow and metering of the metal powder out of the downstream opening and underneath a first wall of the plurality of walls of the hopper, and ceasing rotation of the roller is configured to inhibit flow of the metal powder out of the downstream opening and underneath the first wall; and a tool configured to engage the roller.

26. The apparatus of claim 25, wherein the tool is at least one of a sheet, a wire, a brush, a blade, an air knife, or a razor.

27. The apparatus of claim 25, wherein the hopper includes at least one wall coupled to an actuator configured to vibrate the at least one wall.

28. The apparatus of claim 25, further comprising a movable belt contacting the roller and configured to be moved by the roller, wherein the metal powder is dispensed onto the movable belt.

* * * * *